(12) United States Patent
Mumura et al.

(10) Patent No.: US 6,189,960 B1
(45) Date of Patent: Feb. 20, 2001

(54) VEHICLE WITH A SUNROOF

(75) Inventors: Etsuhisa Mumura, Susono; Takuya Otsuka, Numazu; Mitsuyoshi Ohno; Shuichi Ishimoto, both of Susono; Shuichi Hironaka, Kitakyushu, all of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/181,616

(22) Filed: Oct. 28, 1998

(30) Foreign Application Priority Data

Feb. 3, 1998 (JP) .................................................. 10-022365

(51) Int. Cl.⁷ ..................................................... B60J 7/057
(52) U.S. Cl. ........................... 296/212; 296/224; 296/214; 296/219; 180/281; 280/730.1; 280/753; 160/7
(58) Field of Search ................................. 280/730.1, 748, 280/749, 751, 753; 180/281; 296/212, 107.1, 219, 100.12, 214, 224; 160/1, 7, 9, 84.06

(56) References Cited

U.S. PATENT DOCUMENTS

| | | | |
|---|---|---|---|
| 3,804,435 | * 4/1974 | See et al. ........................... | 280/753 X |
| 5,167,296 | * 12/1992 | Schreire et al. ................... | 296/223 X |
| 5,707,075 | * 1/1998 | Kraft et al. ........................ | 280/730.2 |
| 5,775,726 | * 7/1998 | Timothy et al. ................... | 280/730.1 |
| 5,788,270 | * 8/1998 | Haland et al. .................... | 280/749 X |
| 5,865,462 | * 2/1999 | Robins et al. ..................... | 280/749 X |

FOREIGN PATENT DOCUMENTS

| | | | |
|---|---|---|---|
| 1150585 | * 6/1963 | (DE) | ...................................... 296/219 |
| 303985 | * 12/1990 | (JP) | ...................................... 296/212 |
| 3-47226 | 5/1991 | (JP) | . |
| 3-47227 | 5/1991 | (JP) | . |
| 3-47228 | 5/1991 | (JP) | . |
| 3-47229 | 5/1991 | (JP) | . |
| 3-47230 | 5/1991 | (JP) | . |
| 3-98123 | 10/1991 | (JP) | . |
| 4-65615 | 6/1992 | (JP) | . |
| 4-65616 | 6/1992 | (JP) | . |
| 7-309129 | 11/1995 | (JP) | . |
| 9-71135 | 3/1997 | (JP) | . |
| 9-175185 | 7/1997 | (JP) | . |
| 93009977 | * 5/1993 | (WO) | ................................... 280/749 |

OTHER PUBLICATIONS

IBM Research Disclosure, No. 416, Copy in Class 280, Subclass 749, Dec. 1998.*

* cited by examiner

*Primary Examiner*—Dennis H. Pedder
(74) *Attorney, Agent, or Firm*—Pillsbury Madison & Sutro LLP

(57) ABSTRACT

When a rollover of a vehicle body is detected by a rollover detection sensor, an inflator is operated. When the inflator is operated, an air bag connected to the inflator through a hose is inflated by a gas ejected from the inflator, downwardly pushes open a front portion of a case accommodating portion of a ceiling interior member as shown by two-dotted chain lines, and expands to a position for closing a sunroof opening portion.

8 Claims, 27 Drawing Sheets

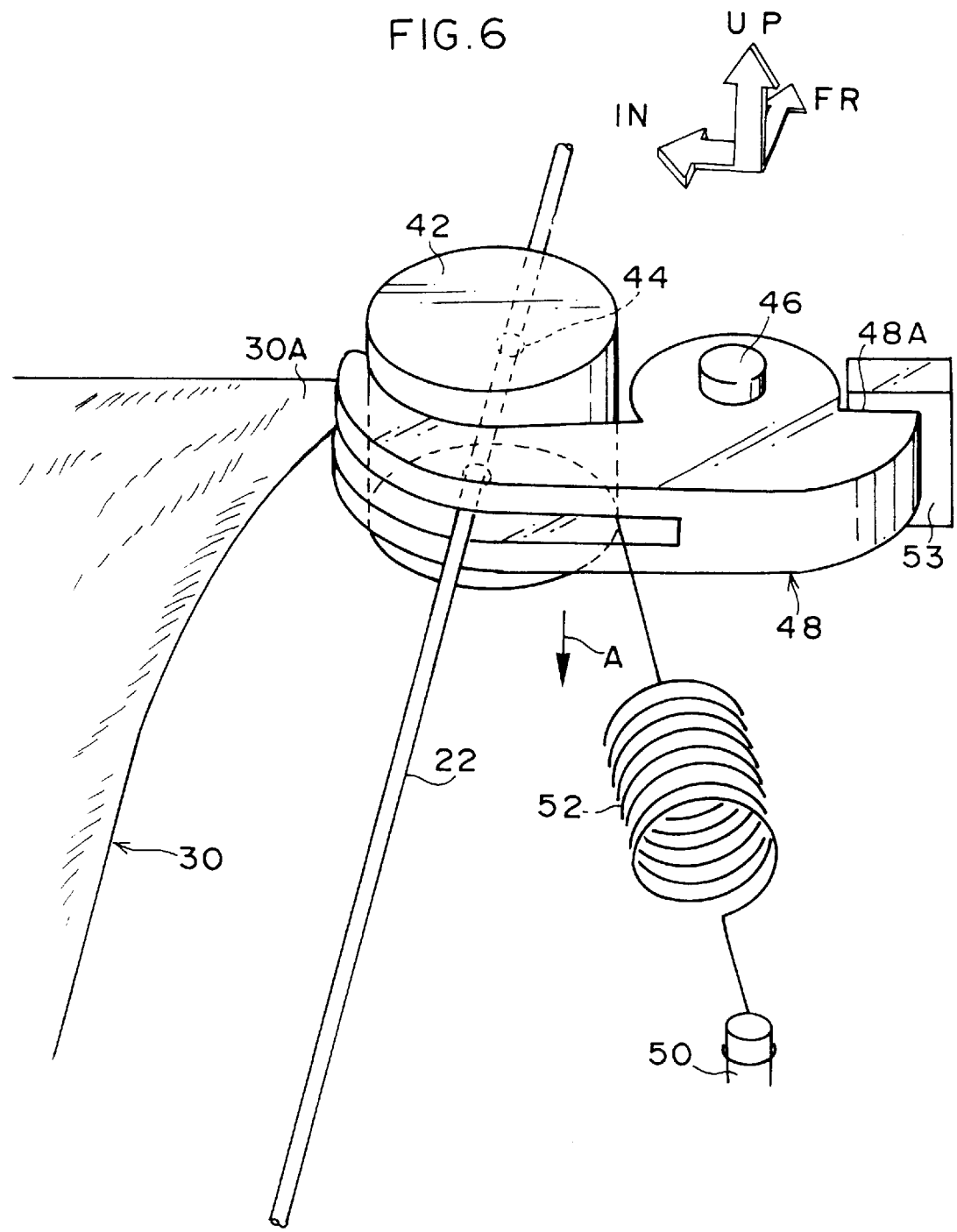

VEHICLE WITH A SUNROOF

BACKGROUND OF THE INVENTION

1. Field of the Invention

The present invention relates to a vehicle with a sunroof in which a roof opening portion formed in a vehicle compartment ceiling portion is openable and closable.

2. Description of the Related Art

A vehicle with a sunroof in which a roof opening portion formed in a vehicle compartment ceiling portion is openable and closable is shown in Japanese Utility Model Application Laid-Open (JP-U) No. 3-47226.

As shown in FIG. 27, in this vehicle with a sunroof, a sunshade (also referred to as a sunroof shade) 200 is slidably provided on the inner side of sunroof glass for opening and closing an opening portion which is formed in a portion of a vehicle compartment ceiling portion of an automobile. This sunshade 200 can be stored between a ceiling panel, which forms the vehicle compartment ceiling portion, and its ceiling interior member. Further, a pair of engaging brackets 202 are provided at an innermost end, in the storing direction, of the sunshade 200, and these engaging brackets 202 are adapted to open the sunshade 200 in an interlocking manner when the sunroof glass is opened. The engaging brackets 202 have resiliently deformable shapes having clip grooves which are open in the direction in which the sunshade 200 is stored in a storing section. Further, a pair of lock pins 204 are respectively disposed on a pair of fixing side members of the storing section, and in a state in which the sunshade 200 is stored in the storing section, the lock pins 204 are adapted to engage in the clip grooves of the engaging brackets 202 so as to lock and hold the engaging brackets 202.

With this sunshade 200, however, it is conceivable that if the vehicle rolls over with the sunroof glass and the sunshade 200 open, luggage or the like in the vehicle compartment might be thrown out of the vehicle through the opening portion formed in the vehicle compartment ceiling portion.

SUMMARY OF THE INVENTION

In view of the above-described circumstances, it is an object of the present invention to provide a vehicle with a sunroof which makes it possible to prevent luggage or the like in a vehicle compartment from being thrown out of the vehicle through the roof opening portion when the vehicle rolls over.

To this end, in accordance with one aspect of the present invention, there is provided a vehicle with a sunroof in which a roof opening portion formed in a vehicle compartment ceiling portion is openably provided, comprising: rollover detecting means for detecting a rollover of a vehicle; driving means operable on the basis of a detection value of the rollover detecting means; and closing means for closing the roof opening portion by the operation of the driving means.

For this reason, when a rollover of the vehicle is detected by the rollover detecting means, the driving means is operated, and the roof opening portion is closed by the closing means. Hence, it is possible to prevent luggage or the like in the vehicle compartment from being thrown out of the vehicle through the roof opening portion.

In accordance with another aspect of the present invention, there is provided a vehicle with a sunroof which is equipped with a sunroof shade which opens and closes a roof opening portion formed in a vehicle compartment ceiling portion, comprising: a lock mechanism for preventing movement of the sunroof shade only when an acceleration of a predetermined value or greater is applied in a sunroof shade opening direction.

For this reason, when an acceleration of a predetermined value or greater is applied in the sunroof shade opening direction at times such as during a rollover or a rear collision, the sunroof shade is locked at its position. Consequently, it is possible to prevent the sunroof shade from being opened further from its position of use. Further, since the sunroof shade is locked only when an acceleration of a predetermined value or greater is applied in the sunroof shade opening direction this locking is released when the acceleration in the opening direction ceases to be applied, so that it is possible to close the sunroof shade by making use of an inertial force acting in the closing direction.

In accordance with still another aspect of the present invention, there is provided a vehicle with a sunroof which is equipped with a sunroof shade which opens and closes a roof opening portion formed in a vehicle compartment ceiling portion, comprising: a belt-shaped member accommodated at a vehicle longitudinal direction front side of the roof opening portion, the belt-shaped portion being connected to a front end of the sunroof shade and adapted to be spread to a position for closing the roof opening portion in interlocking relation to the sunroof shade.

For this reason, if the sunroof shade is opened, the belt-shaped member is drawn out and is spread to the position for closing the roof opening portion. If the sunroof shade is closed, the belt-shaped member is wound up in roll form. Consequently, in either state, the roof opening portion is always closed by either the belt-shaped member or the sunroof shade, so that, through a simple construction, it is possible to prevent luggage or the like in the vehicle compartment from being thrown out of the vehicle in the event of a rollover.

BRIEF DESCRIPTION OF THE DRAWINGS

FIG. 6 is a perspective view taken from a diagonally rearward direction of the vehicle, and illustrates a locking means of the vehicle with a sunroof in accordance with the first embodiment of the present invention;

DESCRIPTION OF THE PREFERRED EMBODIMENTS

Figure 1:
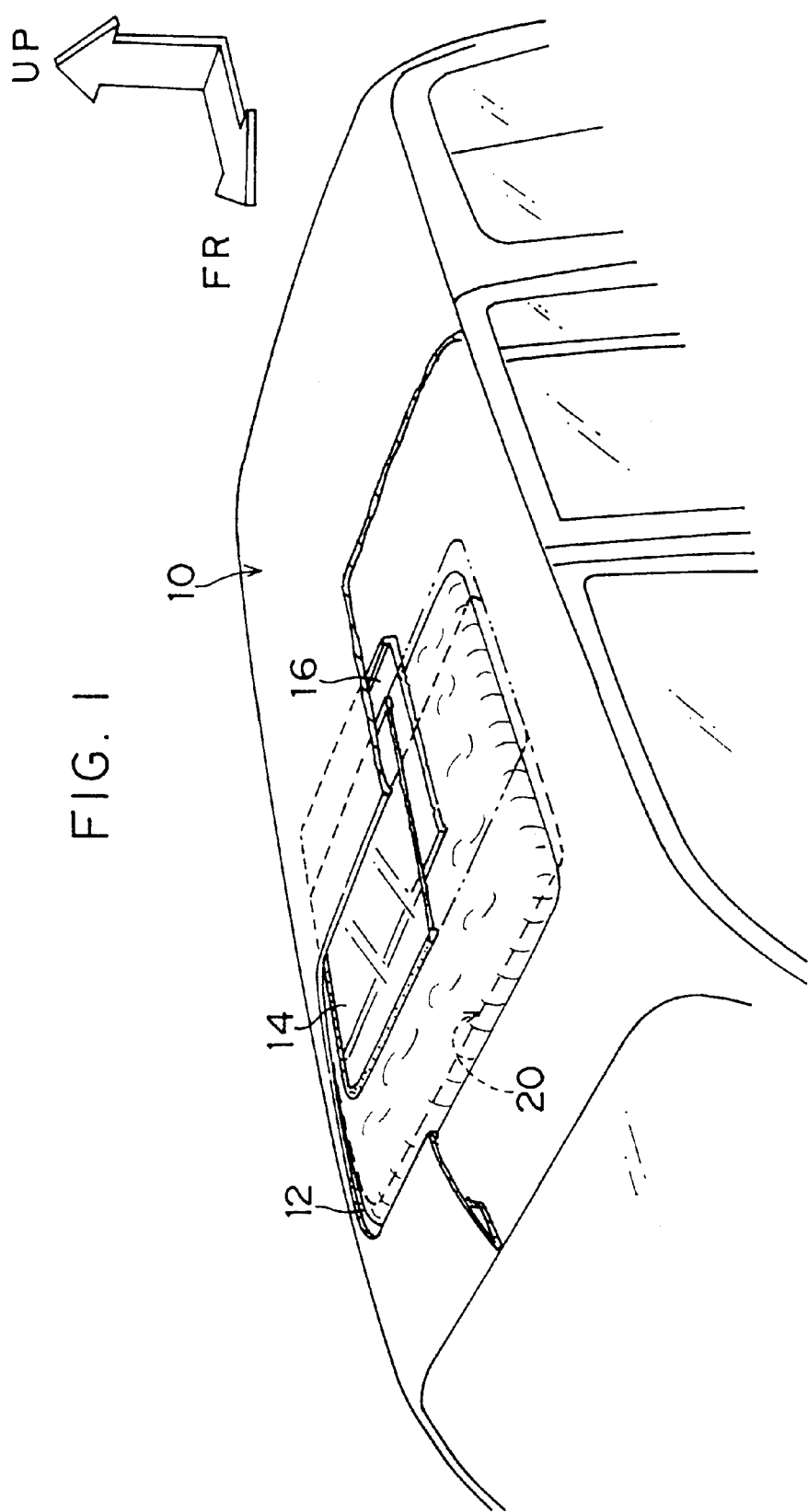
FIG. 1 is a fragmentary perspective view taken from a diagonally forward direction of the vehicle, and illustrates a vehicle compartment ceiling portion of the vehicle with a sunroof in accordance with a first embodiment of the present invention.

Referring now to FIGS. 1 to 5, a description will be given of a first embodiment of a vehicle with a sunroof in accordance with the present invention. It should be noted that, in the drawings, arrow FR indicates the forward direction of the vehicle, arrow UP indicates the upward direction of the vehicle, and arrow IN indicates the transversely inward direction of the vehicle.

As shown in FIG. 1, a rectangular sunroof opening portion 12 is formed in a vehicle compartment ceiling portion 10 of the vehicle in this embodiment. The sunroof opening portion 12 can be opened or closed by a sunroof (moonroof) panel 14 formed of a transparent or semitransparent material as a portion of the sunroof which slides in the longitudinal direction of the vehicle. A sunshade 16 which forms another portion of the sunroof is disposed on the vehicle compartment inner side of the sunroof panel 14 in such a manner as to be slidable in the longitudinal direction of the vehicle.

Figure 2:
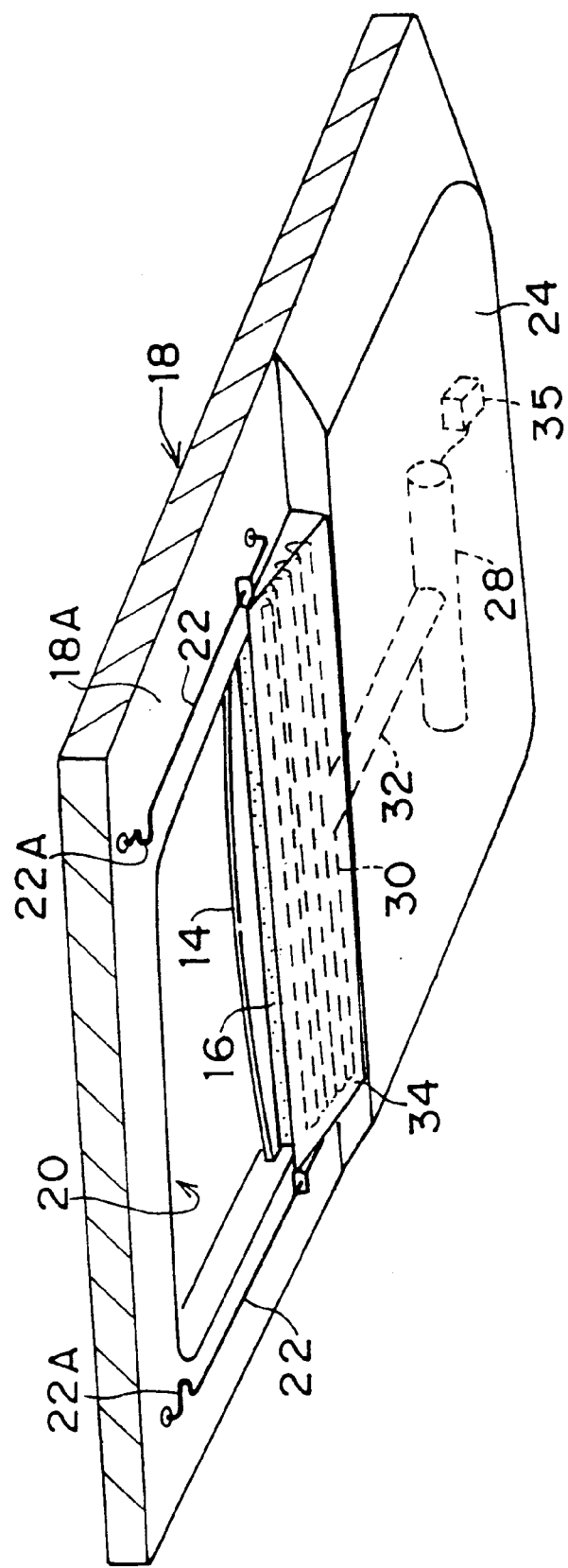
FIG. 2 is a perspective view taken from a diagonally forward direction on the inner side of a vehicle compartment, and illustrates the vehicle compartment ceiling portion of the vehicle with a sunroof in accordance with the first embodiment of the present invention.

As shown in FIG. 2, a ceiling interior member 18 is disposed on the inner side of the vehicle compartment ceiling portion, and an opening portion 20 is formed in the ceiling interior member 18 at a position opposing the sunroof opening portion 12 (see FIG. 1). A pair of left and right guide wires 22 are respectively disposed on an underside 18A of the ceiling interior member 18 along opposite sides of the opening portion 20. A pair of engaging portions 22A serving as locking means which are bent in U-shapes in mutually approaching directions are respectively formed in the vicinities of distal ends of these guide wires 22. Further, in the ceiling interior member 18, a portion located rearwardly of the opening portion 20 projects downward and is formed as a case accommodating portion 24.

Figure 3:
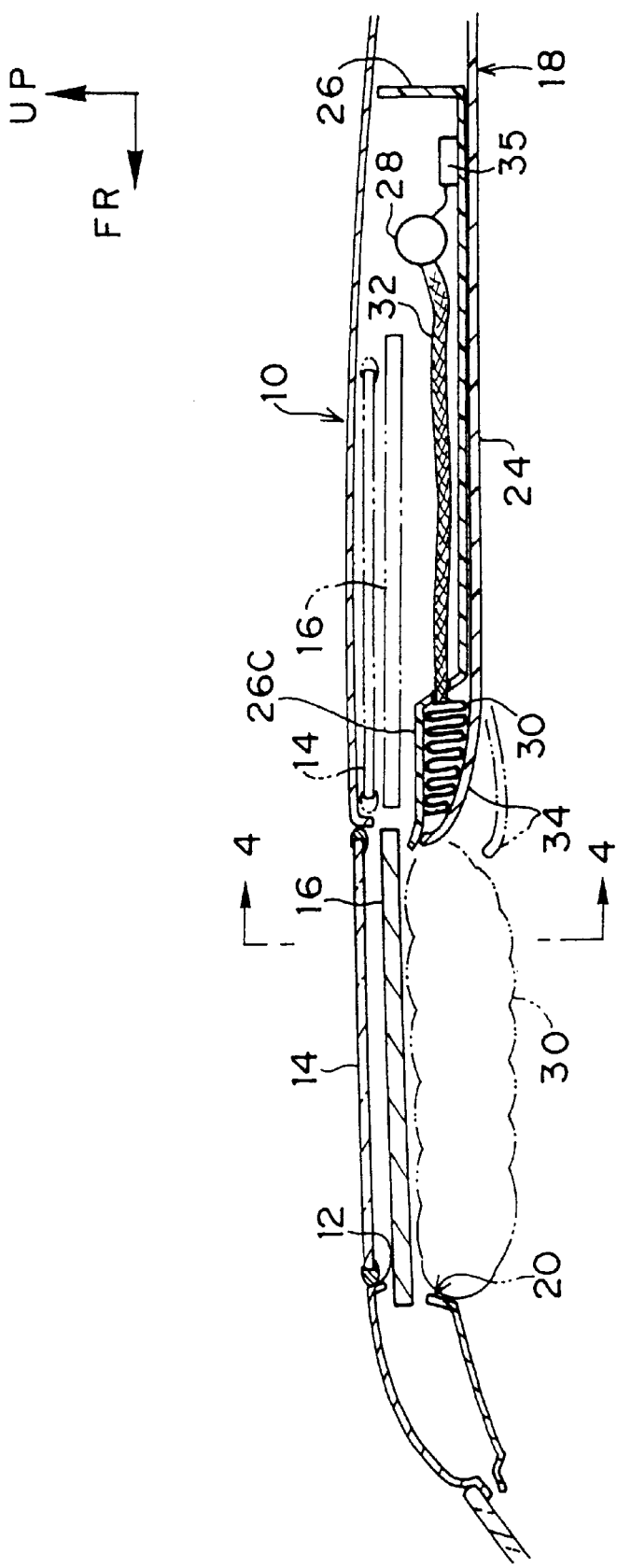
FIG. 3 is a longitudinal sectional view illustrating the vehicle compartment ceiling portion of the vehicle with a sunroof in accordance with the first embodiment of the present invention.

As shown in FIG. 3, a sunroof case 26 is disposed in the case accommodating portion 24 of the ceiling interior member 18.

Figure 4:
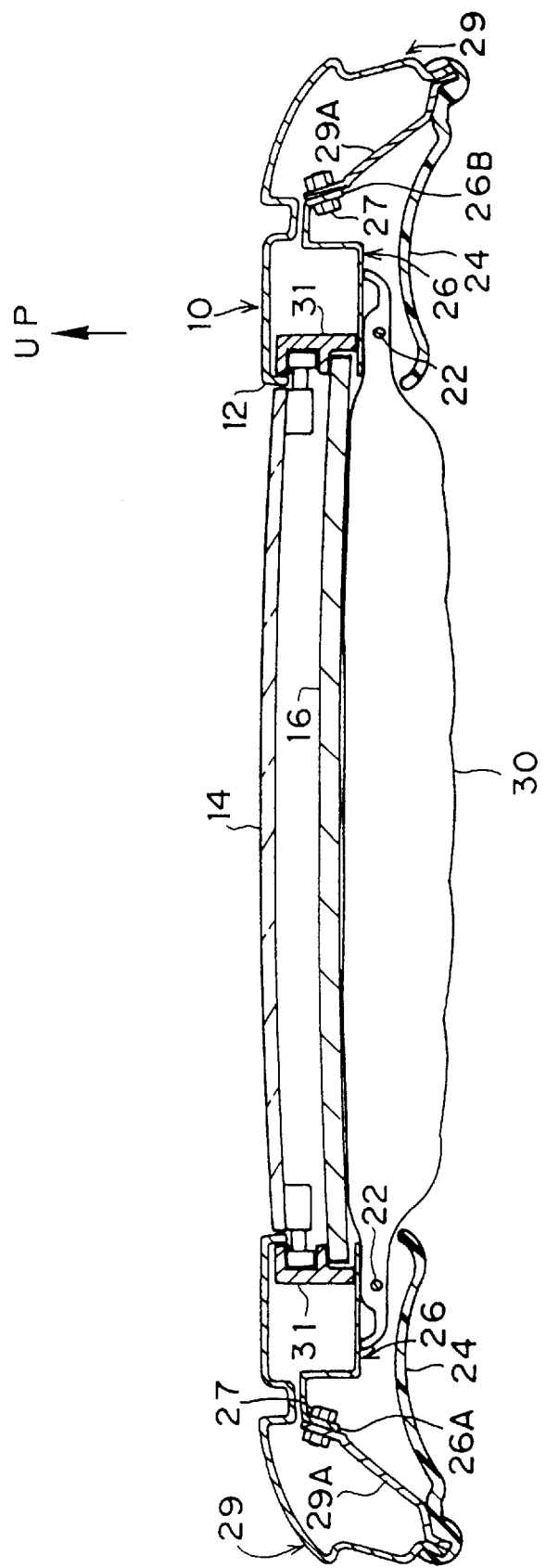
FIG. 4 is a cross-sectional view taken along line 4—4 in FIG. 3.

As shown in FIG. 4, vehicle transverse ends 26A and 26B of the sunroof case 26 are attached to an inner panel 29A of a roof side rail 29 by means of fixing members 27 such as bolts. Further, a pair of left and right rails 31 are attached to the sunroof case 26, and the sunroof panel 14 and the sunshade 16 are slidably supported between these rails 31.

As shown in FIG. 3, a cylindrical inflator 28 serving as a driving means is disposed in a rear portion of the sunroof case 26 along the transverse direction of the vehicle. The inflator 28 is connected to a rollover detection sensor 35 serving as a rollover detecting means disposed in the ceiling portion or the like of the vehicle body, and the inflator 28 is adapted to be operated when a rollover is detected by the rollover detection sensor 35. An air bag 30 serving as a closing means is disposed adjacent to and in the rear of the opening portion 20 of the ceiling interior member 18. The air bag 30 is folded in a bellows shape along the longitudinal direction of the vehicle, and is accommodated between the ceiling interior member 18 and a front portion 26C of the sunroof case 26.

The air bag 30 is connected to the inflator 28 by means of a hose 32, is inflated by a gas ejected from the inflator 28, pushes open a front portion 34 of the case accommodating portion 24 of the ceiling interior member 18 in a downward direction, and is expanded to a position for closing the sunroof opening portion 12, as shown by two-dotted chain lines in FIG. 3.

Figure 5:
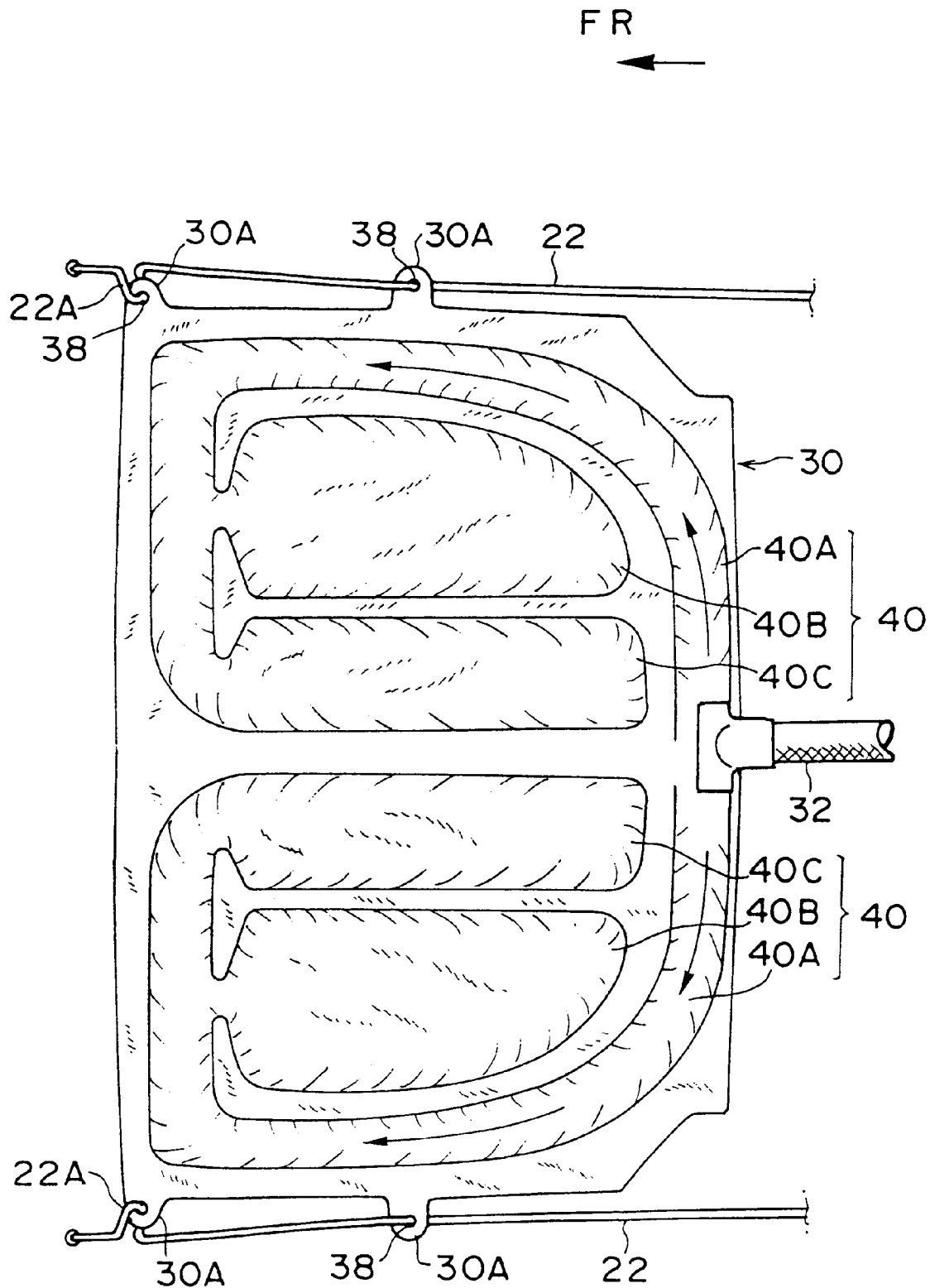
FIG. 5 is a plan view illustrating an unfolded state of an air bag of the vehicle with a sunroof in accordance with the first embodiment of the present invention.

As shown in FIG. 5, engaging portions 30A are formed projectingly at forward-end opposite side portions of the air bag 30 and in the rear thereof, and the guide wires 22 are respectively passed through through holes 38 formed in these engaging portions 30A.

An inflatable portion 40 of the air bag 30 has an expansion-inducing inflatable portion 40A serving as an expansion inducing means. The expansion-inducing inflatable portion 40A extends from its connecting portion for connection to the hose 32 toward vehicle transverse opposite end portions of the air bag 30, then extends toward the front along the vehicle transverse opposite end portions, and further extends in the transversely inward direction of the vehicle in parallel to a front end portion of the air bag 30. Further, a plurality of inflatable chambers 40B and 40C are formed in such a manner as to extend in the rearward direction of the air bag 30 from that portion of the expansion-inducing inflatable portion 40A which is parallel to the front end portion of the air bag 30. Accordingly, the gas ejected from the hose 32 first inflates the expansion-inducing inflatable portion 40A and then inflates the inflatable chambers 40B and 40C, so that the air bag 30 is adapted to expand in the forward direction of the vehicle preferentially starting with its vehicle transverse opposite end portions.

Next, a description will be given of the operation of this embodiment.

With the vehicle with a sunroof in accordance with this embodiment, when a rollover of the vehicle body is detected by the rollover detection sensor 35, the inflator 28 is operated. When the inflator 28 is operated, the air bag 30 connected to the inflator 28 by means of the hose 32 is inflated by the gas ejected from the inflator 28, pushes open the front portion 34 of the case accommodating portion 24 of the ceiling interior member 18 in the downward direction, and is expanded to the position for closing the sunroof opening portion 12, as shown by the two-dotted chain lines in FIG. 3.

At this time, the engaging portions 30A formed at the forward-end opposite side portions of the air bag 30 and in the rear thereof move forward along the guide wires 22, and the engaging portions 30A formed at the forward-end opposite side portions of the air bag 30 engage the engaging portions 22A of the guide wires 22. Hence, the air bag 30 is held in the expanded state (in the state shown in FIG. 5).

As a result, even if the sunroof is in an open state (in the state in which the sunroof panel 14 and the sunshade 16 are open), the air bag 30 which expanded makes it possible to prevent luggage and the like in the vehicle compartment from being thrown out of the vehicle through the sunroof opening portion 12.

In addition, with the vehicle with a sunroof in accordance with this embodiment, since the air bag 30 is inflated at the sunroof opening portion 12, a cushioning effect can be obtained by the air bag 30, so that there is an effect of protecting an occupant. Furthermore, in a case where only the sunshade 16 is in the closed position, and the sunshade 16 has become broken, the air bag 30 makes it possible to reliably prevent luggage and the like in the vehicle compartment from being thrown out of the vehicle.

In addition, with the vehicle with a sunroof in accordance with this embodiment, as shown in FIG. 5, since the gas ejected from the hose 32 first inflates the expansion-inducing inflatable portion 40A and then inflates the inflatable chambers 40B and 40C, the air bag 30 expands in the forward direction of the vehicle preferentially starting with its vehicle transverse opposite end portions. Consequently, the air bag 30 expands smoothly, and it is possible to shorten the time required for completing the expansion of the air bag.

In the above-described first embodiment, the arrangement provided is such that the engaging portions 22A are formed in the guide wires 22, and the engaging portions 30A formed at the forward-end opposite side portions of the air bag 30 engage the engaging portions 22A, thereby allowing the air bag 30 to be held in the expanded state (in the state shown in FIG. 5). As a modification of this arrangement, an arrangement may be provided as follows: Namely, as shown in FIG. 6, cylindrical moving members 42 are respectively provided at the engaging portions 30A formed at the forward-end opposite side portions of the air bag 30, and the guide wires 22 are each passed through a through hole 44 formed in the moving member 42. Further, a retaining pawl 48 serving as the locking means is swingably attached by a shaft 46 at a position adjacent to a front end portion of the sunroof opening portion 12 of the vehicle compartment ceiling portion 10. The retaining pawl 48 is urged in a substantially rearward direction (in the direction of arrow A in FIG. 6) by means of a coil spring 52 having one end connected to a pin 50 provided uprightly on the vehicle compartment ceiling portion 10. It should be noted that a front surface 48A of a vehicle transverse outer end portion of the retaining pawl 48 abuts against a detent 53 provided uprightly on the vehicle compartment ceiling portion 10, so that the retaining pawl 48 is prevented from swinging rearwardly of its engaging position (see FIGS. 6 and 7A).

Figure 7A:
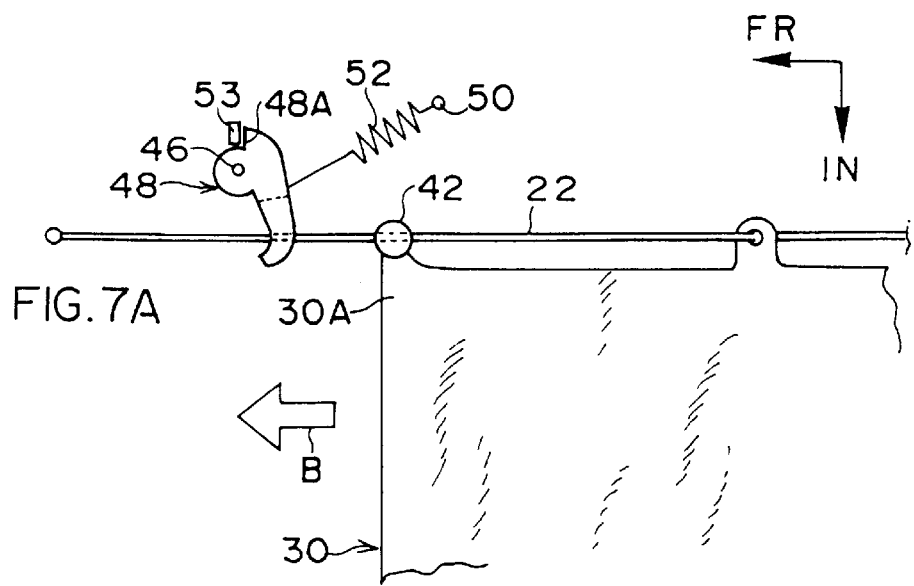
FIG. 7A is a diagram illustrating the operation of the vehicle with a sunroof in accordance with the first embodiment of the present invention.
Figure 7B:
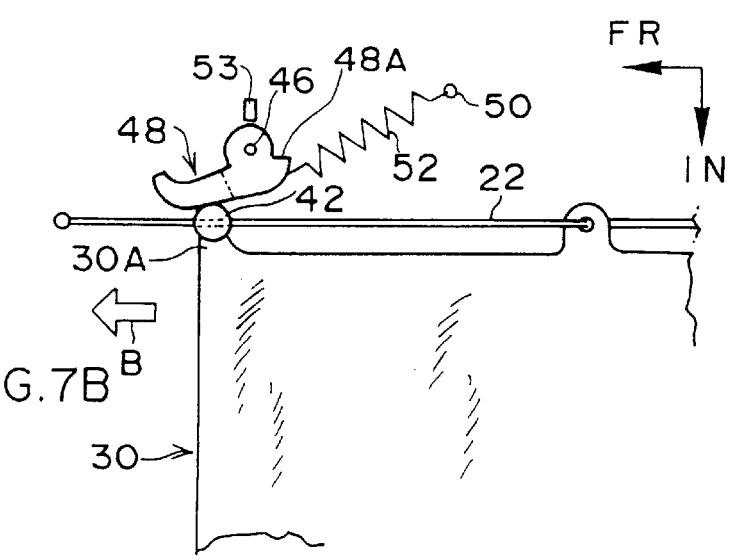
FIG. 7B is a diagram illustrating the operation of the vehicle with a sunroof in accordance with the first embodiment of the present invention.
Figure 7C:
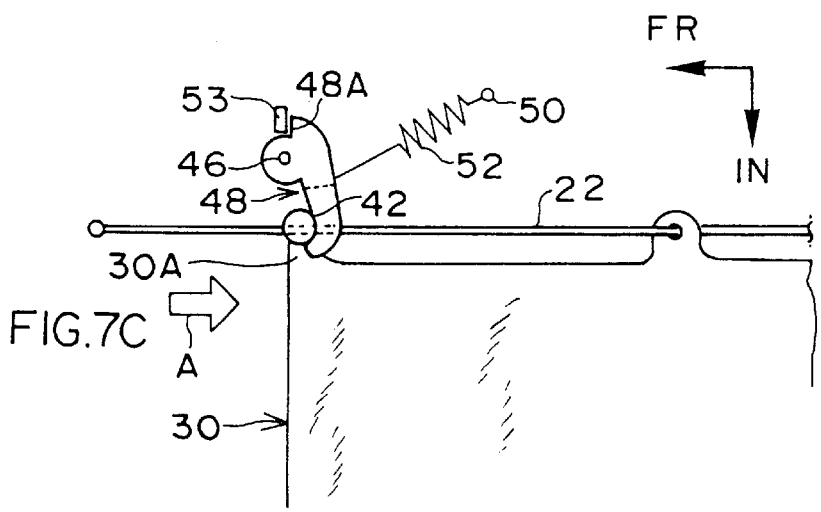
FIG. 7C is a diagram illustrating the operation of the vehicle with a sunroof in accordance with the first embodiment of the present invention.

Accordingly, in this arrangement, when the air bag 30 is expanded, as shown in FIG. 7A, each moving member 42 moves in the forward direction of the vehicle (in the direction of arrow B) along the guide wire 22. Then, as shown in FIG. 7B, the moving member 42 abuts against the retaining pawl 48 from the rear, advances while swinging the retaining pawl 48 in the forward direction against the urging force of the coil spring 52, and passes the retaining pawl 48. Subsequently, when the supply of the gas from the inflator is stopped, as shown in FIG. 7C, the moving member 42 moves in the rearward direction of the vehicle (in the direction of arrow A) along the guide wire 22. In this case, however, the retaining pawl 48 is swung in the rearward direction by the coil spring 52 and is returned to its engaging position, so that the moving member 42 engages the retaining pawl 48. Consequently, the air bag 30 is held in the expanded state (in the state shown in FIG. 7C).

Next, referring to FIGS. 8 to 12, a description will be given of a second embodiment of the vehicle with a sunroof in accordance with the present invention. It should be noted that the same members as those of the first embodiment will be denoted by the same reference numerals, and a description thereof will be omitted.

Figure 8:
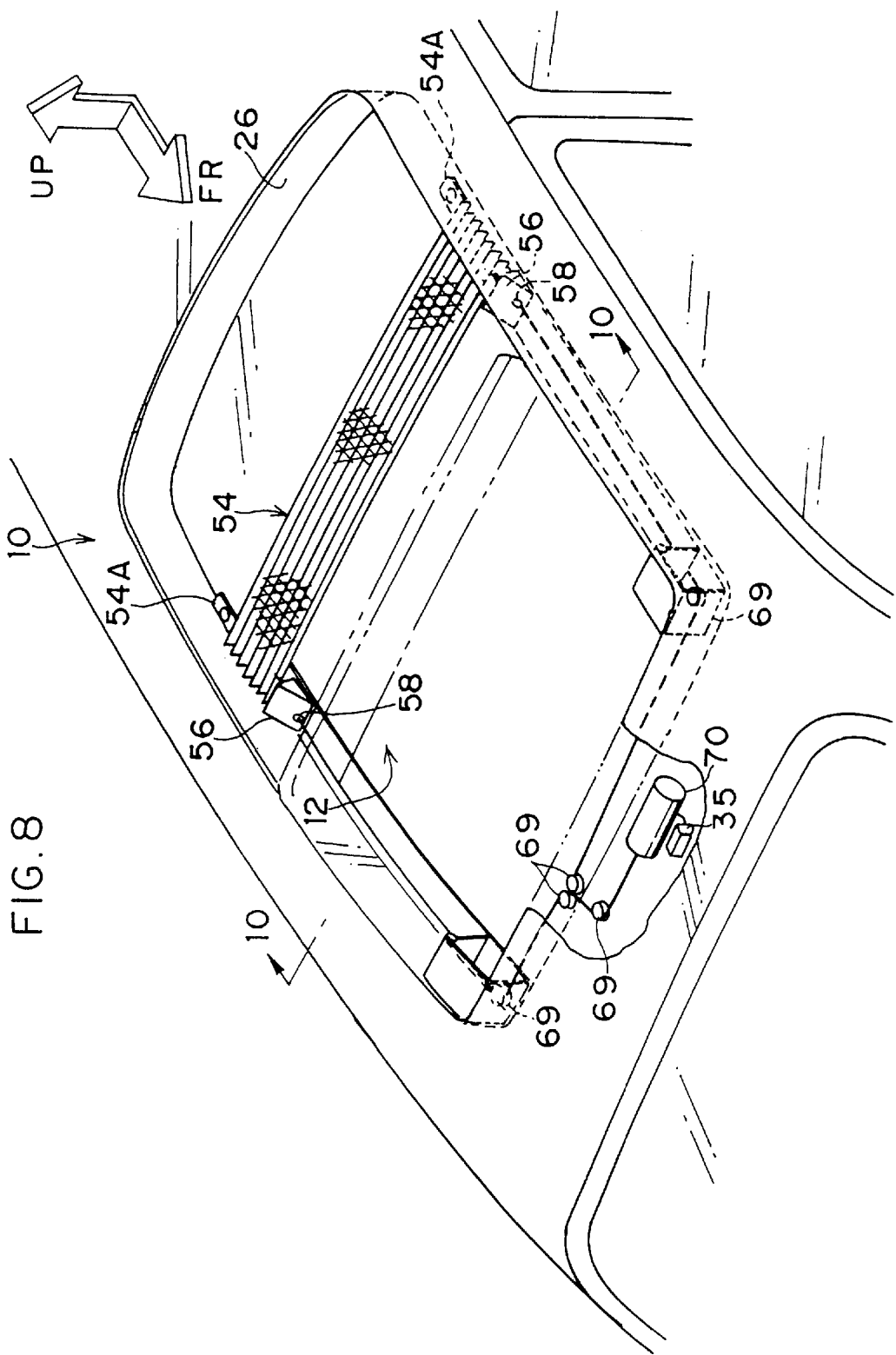
FIG. 8 is a fragmentary perspective view taken from a diagonally forward direction of the vehicle, and illustrates the vehicle compartment ceiling portion of the vehicle with a sunroof in accordance with a second embodiment of the present invention.

As shown in FIG. 8, in this embodiment, a net 54 serving as the closing means (belt-shaped member) is folded in a bellows shape and is accommodated in the rear of the sunroof opening portion 12 along the longitudinal direction of the vehicle. A pair of rearward-end opposite side portions 54A of the net 54 are fixed to the sunroof case 26 by means of fixing means such as screws. Further, a pair of blocks 56 serving as traction-force transmitting members are attached to forward-end opposite side portions of the net 54.

Figure 9:
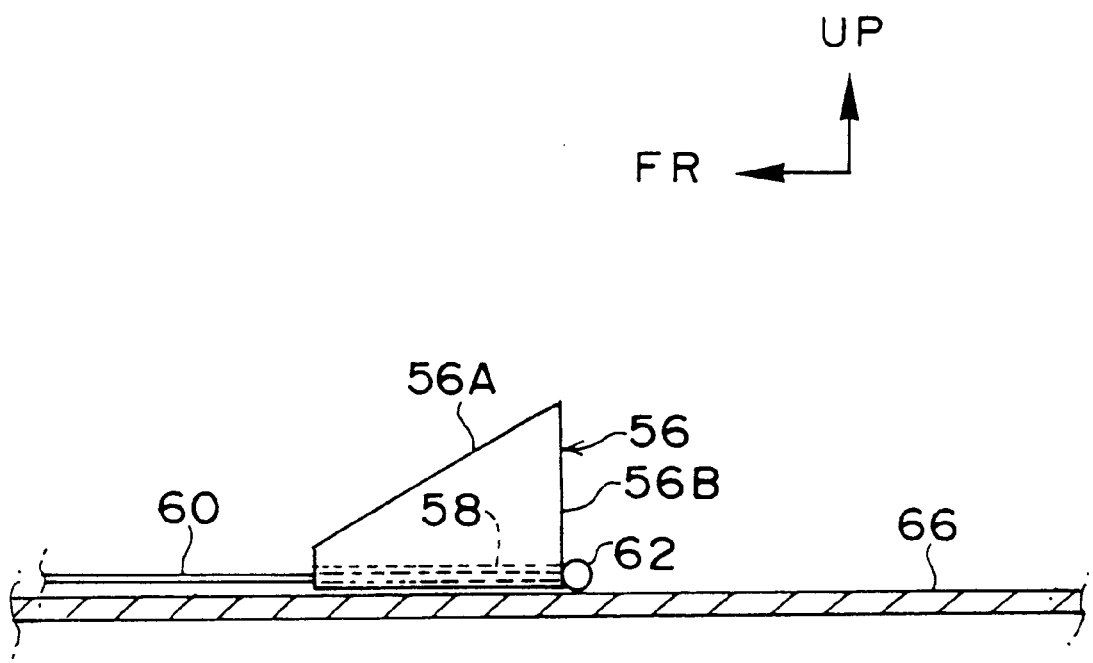
FIG. 9 is a side view illustrating a traction-force transmitting member of the vehicle with a sunroof in accordance with the second embodiment of the present invention.

As shown in FIG. 9, each block 56 is made thicker toward the rear, and its upper surface 56A is formed as an inclined surface. A through hole 58 is formed in a lower portion of the block 56 in such a manner as to extend in the longitudinal direction of the vehicle. A wire 60 is passed through the through hole 58. A ball 62 provided at a rear end of the wire 60 abuts against a rear wall portion 56B of the block 56, and the block 56 is movable relative to the wire 60.

Figure 10:
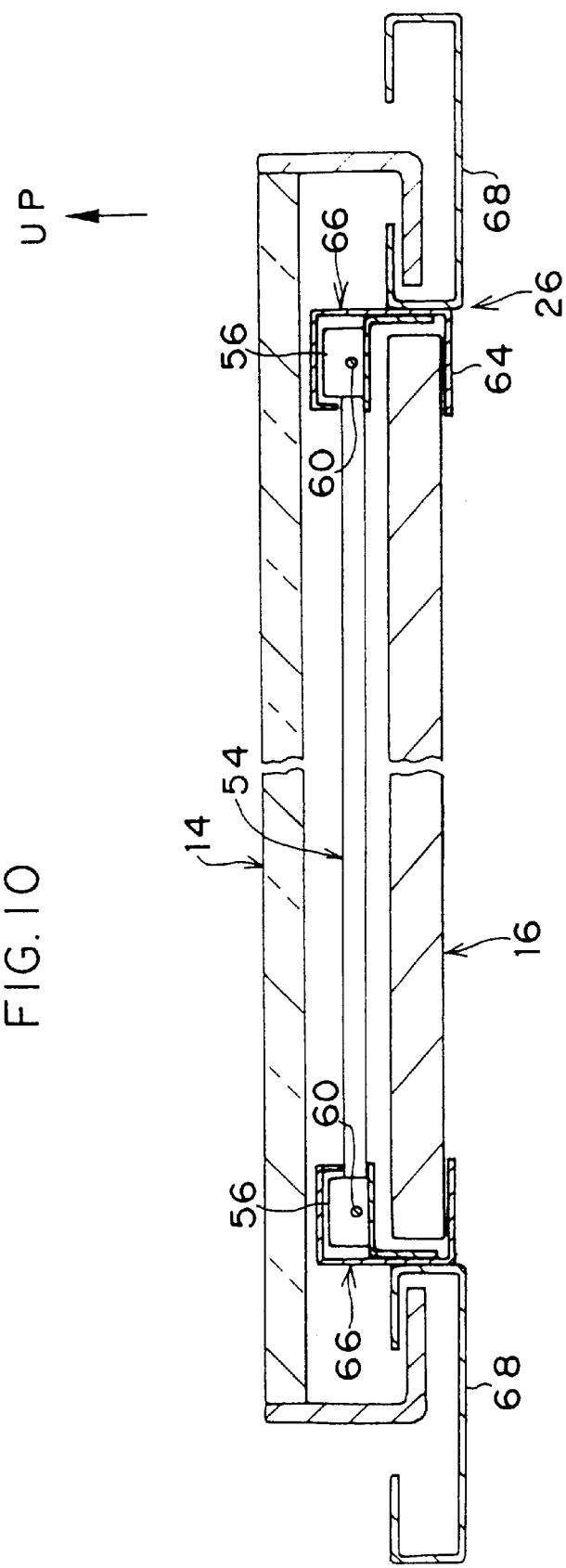
FIG. 10 is a cross-sectional view taken along line 10—10 in FIG. 8.

As shown in FIG. 10, the net 54 and the wire 60 are disposed between the sunroof panel 14 and the sunshade 16, and the blocks 56 are movable in the longitudinal direction of the vehicle along a pair of lock-member guide rails 66 which are respectively formed on top of a pair of sunshade guide rails 64 of the sunroof case 26. Incidentally, a pair of sunroof-panel guide rails 68 are respectively formed on vehicle transverse outside side portions of the sunshade guide rails 64, and the sunroof panel 14 is movable in the longitudinal direction of the vehicle along the sunroof-panel guide rails 68.

As shown in FIG. 8, a wire pulling device 70 serving as the driving means is disposed in a substantially central portion in the vehicle transverse direction of the sunroof case 26, and the wires 60 are connected to the wire pulling device 70 via a plurality of guide rollers 69. The wire pulling device 70 is a known device which is used in a seat belt pretensioner or the like, and is connected to the rollover detection sensor 35. Accordingly, when a rollover is detected by the rollover detection sensor 35, the wire pulling device 70 is operated to pull the wires 60.

Figure 11:
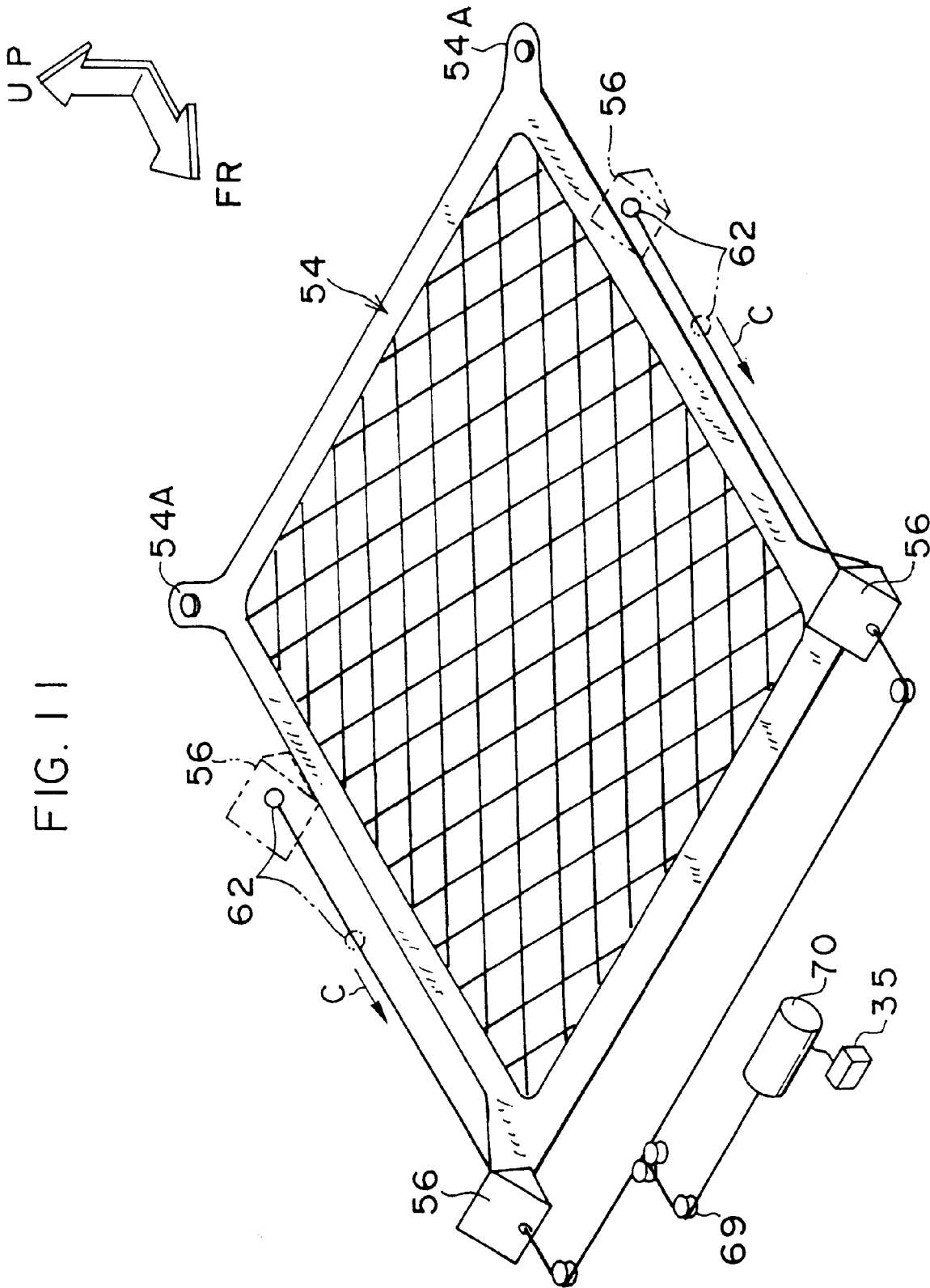
FIG. 11 is a perspective view taken from a diagonally forward direction of the vehicle, and illustrates a stretched state of a belt-shaped member of the vehicle with a sunroof in accordance with the second embodiment of the present invention.

As shown in FIG. 11, when the wire pulling device 70 is operated, the wires 60 are pulled, and during the first half of the operation the blocks 56 are pushed forward (in the direction of arrow C in FIG. 11) by the balls 62 disposed at the rear ends of the wires 60. During the latter half of the operation, when the pulling of the wires 60 ends, the balls 62 stop, for instance, at the positions indicated by the two-dotted chain lines in FIG. 11, but the blocks 56 continue to move forward along the wires 60 owing to the inertial force. Consequently, the net 54 is completely stretched to close the sunroof opening portion 12.

Figure 12:
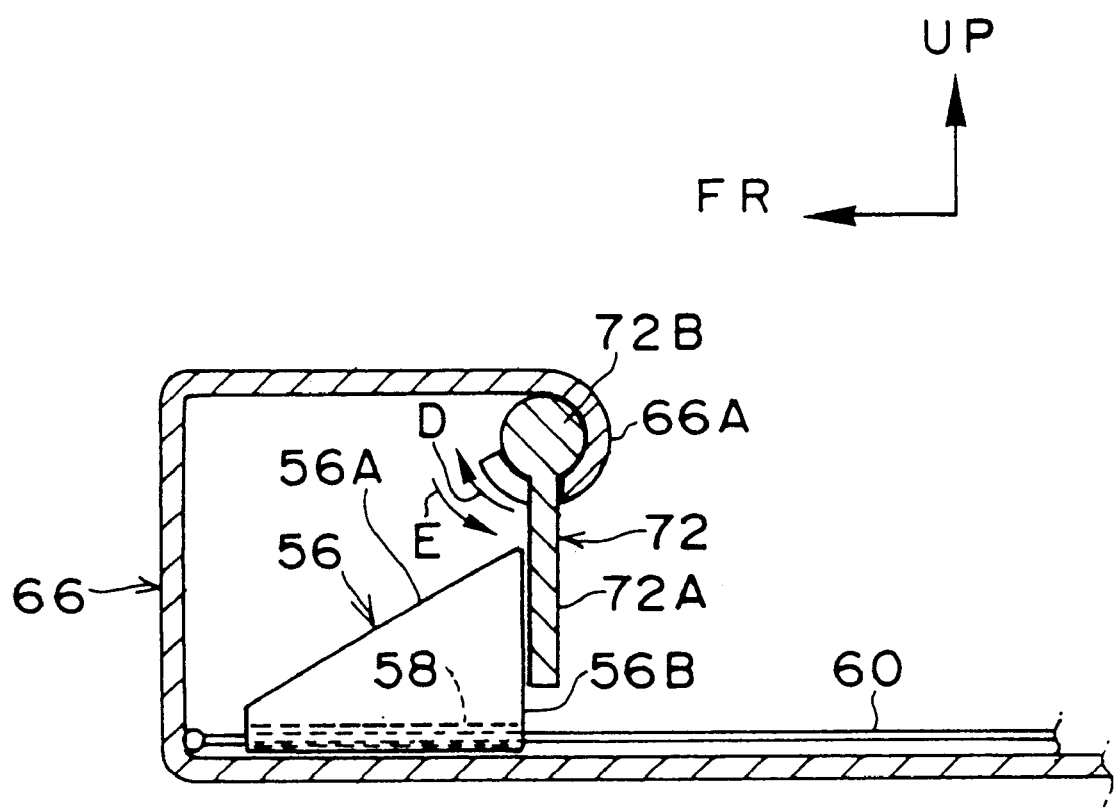
FIG. 12 is a side view illustrating the positional relationship between the traction-force transmitting member and the locking means of the vehicle with a sunroof in accordance with the second embodiment of the present invention.

As shown in FIG. 12, a stopper 72 serving as the locking means is disposed at a front-end upper portion of each lock-member guide rail 66. The stopper 72 has a hinge portion 72B formed at an upper end portion of a plate-shaped stopper portion 72A, and the stopper 72 is swingably supported at the hinge portion 72B by a bearing portion 66A formed in the lock-member guide rail 66. The stopper 72 is swingable clockwise in FIG. 12 (in the direction of arrow D in FIG. 12) and counterclockwise in FIG. 12 (in the direction of arrow E in FIG. 12) in a region located forwardly of the position at which the stopper portion 72A is set vertically downward (the position indicated by the solid lines in FIG. 12). Accordingly, when the block 56 moves forward, the stopper portion 72A is swung forward by being pressed by the upper surface 56A of the block 56, and permits the passage of the block 56. However, since the stopper portion 72A returns to its vertical downward position (the position indicated by the solid lines in FIG. 12) due its own weight after the passing of the block 56, when the block 56 moves in the rearward direction, the stopper portion 72A abuts against the rear wall portion 56B of the block 56, thereby preventing the rearward movement of the block 56.

Next, a description will be given of the operation of this embodiment.

With the vehicle with a sunroof in accordance with this embodiment, when a rollover of the vehicle body is detected by the rollover detection sensor 35, the wire pulling device 70 is operated to pull the wires 60. Consequently, during the first half of the operation the blocks 56 are pushed forward (in the direction of arrow C in FIG. 11) by the balls 62 disposed at the rear ends of the wires 60. During the latter half of the operation when the pulling of the wires 60 ends, the balls 62 stop, for instance, at the positions indicated by the two-dotted chain lines in FIG. 11, but the blocks 56 continue to move forward along the wires 60 owing to the inertial force. Consequently, the net 54 is completely stretched to close the sunroof opening portion 12.

The stopper 72 is disposed at the front-end upper portion of each lock-member guide rail 66. When the block 56 moves forward, the stopper portion 72A of the stopper 72 is swung forward by being pressed by the upper surface 56A of the block 56, and permits the passage of the block 56.

However, since the stopper portion 72A returns to its vertical downward position (the position indicated by the solid lines in FIG. 12) due its own weight after the passing of the block 56, when the block 56 moves in the rearward direction, the stopper portion 72A abuts against the rear wall portion 56B of the block 56, thereby preventing the rearward movement of the block 56. Hence, the net is held in the stretched state (in the state shown in FIG. 11).

As a result, even if the sunroof is in the open state (in the state in which the sunroof panel 14 and the sunshade 16 are open), the stretched net 54 makes it possible to reliably prevent luggage and the like in the vehicle compartment from being thrown out of the vehicle through the sunroof opening portion 12.

In addition, with the vehicle with a sunroof in accordance with this embodiment, since the net 54 which can be made compact in its folded state is used, there is an advantage in terms of an accommodating space. In addition, since the net 54 is driven in the forward direction of the vehicle by the wire pulling device 70 during the first half of the operation, and the net 54 is stretched by the inertial force during the second half of the operation, the operating stroke of the wire pulling device 70 can be minimized, thereby make it possible to make the apparatus compact.

Next, referring to FIGS. 13 to 15, a description will be given of a third embodiment of the vehicle with a sunroof in accordance with the present invention. It should be noted that the same members as those of the first embodiment will be denoted by the same reference numerals, and a description thereof will be omitted.

Figure 13:
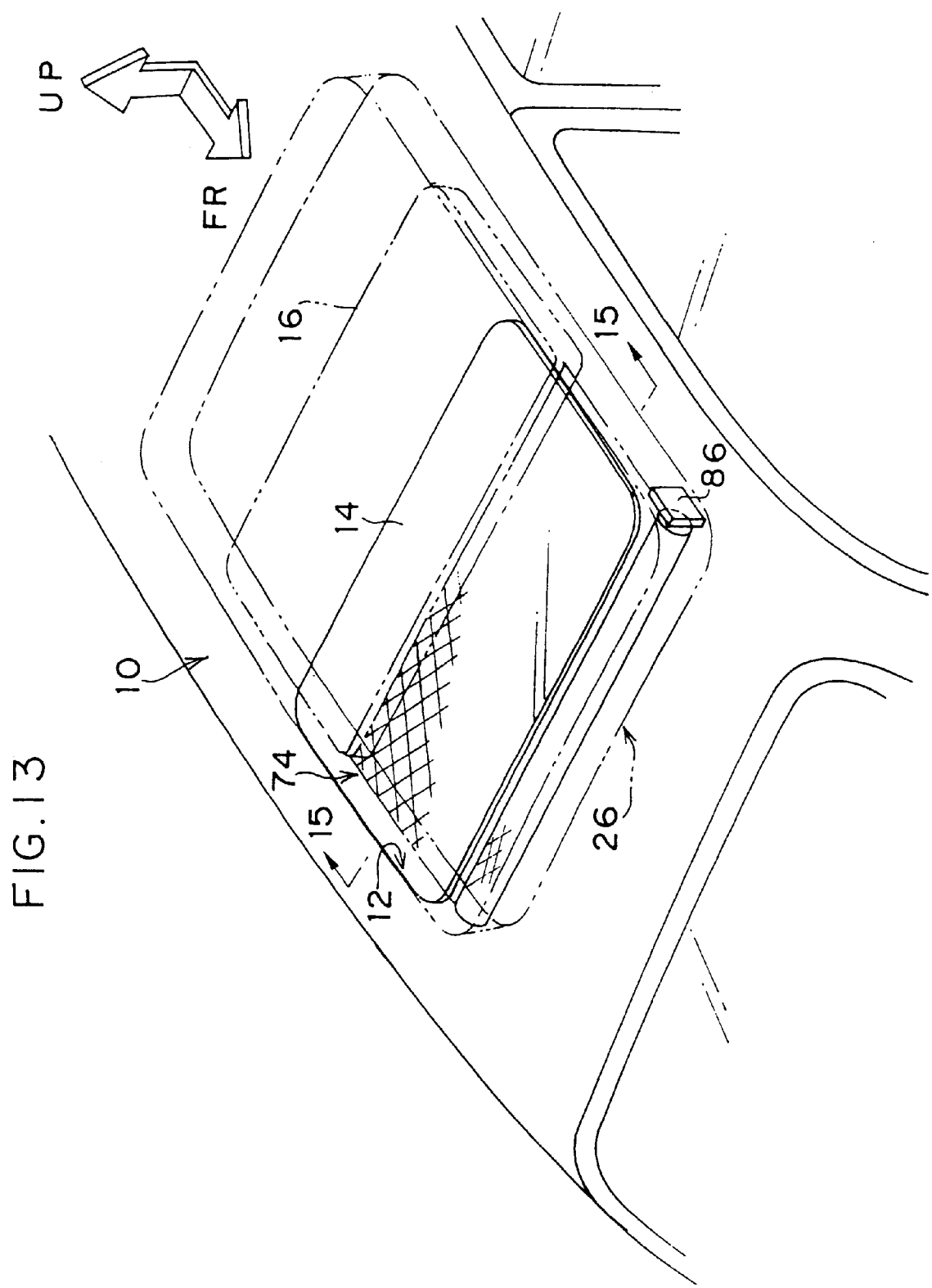
FIG. 13 is a fragmentary perspective view taken from a diagonally forward direction of the vehicle, and illustrates the vehicle compartment ceiling portion of the vehicle with a sunroof in accordance with a third embodiment of the present invention.

As shown in FIG. 13, with the vehicle with a sunroof in accordance with this embodiment, a net 74 serving as a belt-shaped member is accommodated in a front portion of the sunroof case 26 in a state in which the net 74 is wound in roll form.

Figure 14:
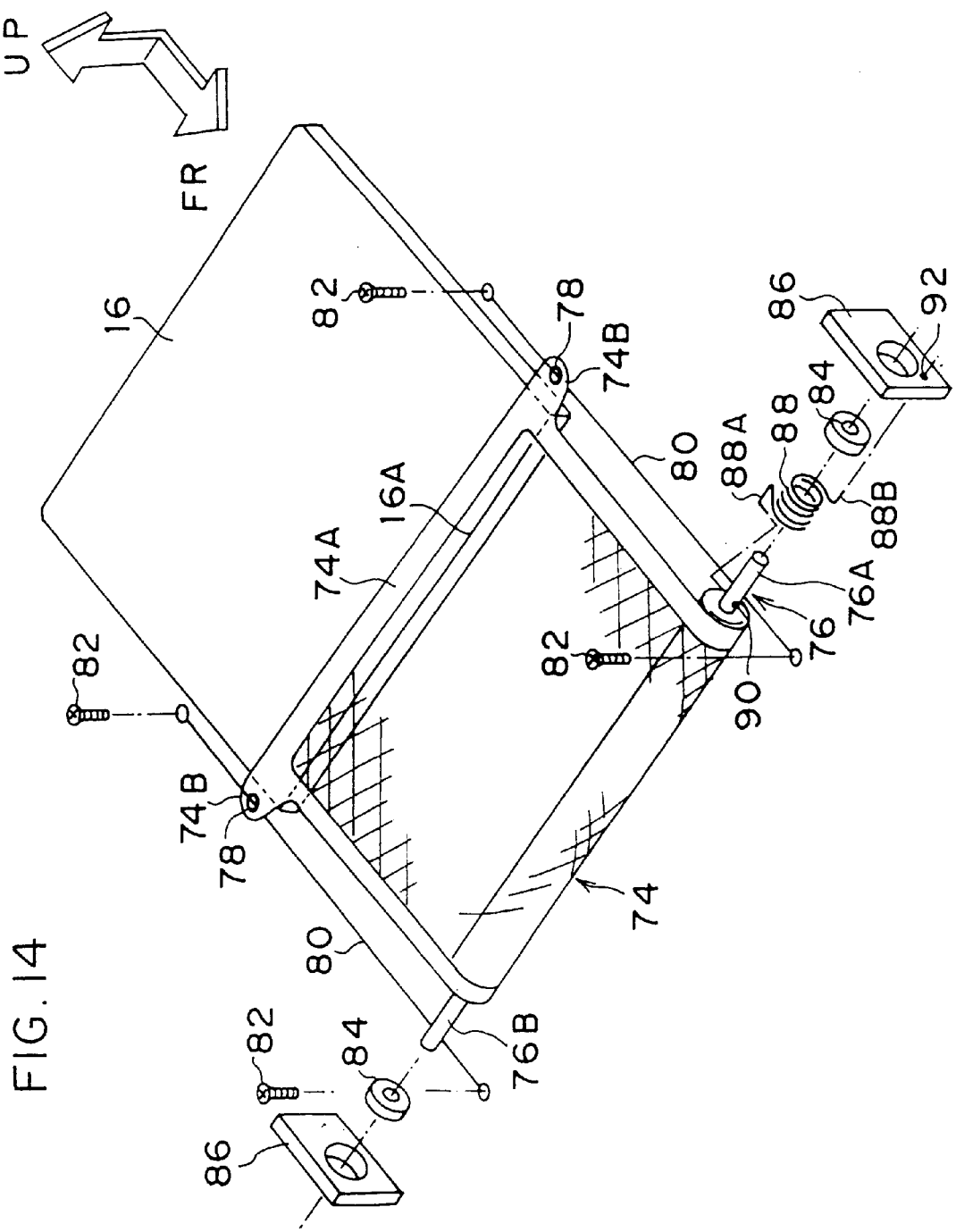
FIG. 14 is an exploded perspective view taken from a diagonally forward direction of the vehicle, and illustrates essential portions of the vehicle with a sunroof in accordance with the third embodiment of the present invention.
Figure 15:
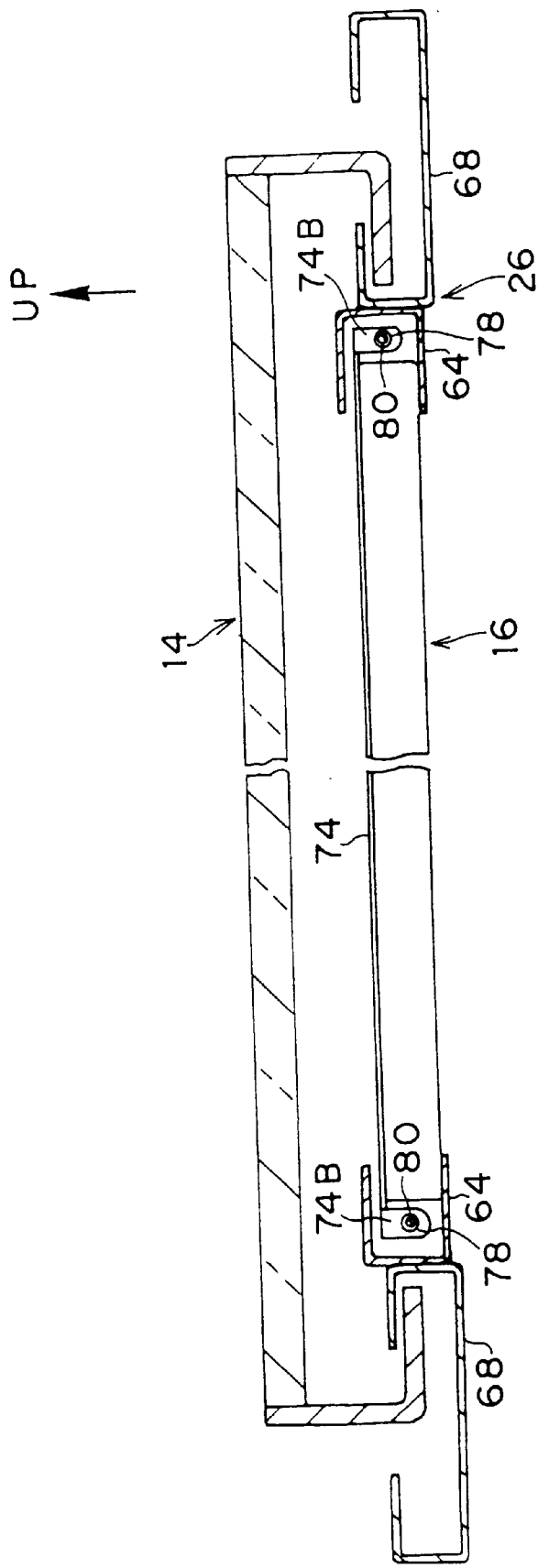
FIG. 15 is a cross-sectional view taken along line 15—15 in FIG. 13.

As shown in FIG. 14, one longitudinal end portion of the net 74 is fixed to an outer peripheral portion of a shaft 76 extending in the transverse direction of the vehicle, while the other longitudinal end portion 74A thereof is fixed to a front end portion 16A of the sunshade 16. Accordingly, if the sunshade 16 is opened, i.e., if the sunshade 16 is moved in the rearward direction of the vehicle, the end portion 74A of the net 74 moves in the rearward direction to stretch the net 74.

A pair of engaging portions 74B are formed projectingly at rearward-end opposite side portions of the net 74, and a pair of guide wires 80 disposed along the longitudinal direction of the vehicle are passed through through holes 78 formed in the engaging portions 74B. Incidentally, longitudinal ends of the guide wires 80 are fixed inside the sunshade guide rails 64 (see FIG. 15) of the sunroof case 26 by means of fixing members 82 such as screws..

Both end portions 76A and 76B of the shaft 76 are respectively supported by a pair of rectangular plate-shaped brackets 86 through bearings 84, and these brackets 86 are fixed to the sunroof case 26. Further, a coil spring 88 is provided around an outer peripheral portion of the end portion 76A of the shaft 76, and one end portion 88A of the coil spring 88 is engaged in a through hole 90 formed in the shaft 76 in such a manner as to extend diametrically. The other end portion 88B of the coil spring 88 is engaged in a through hole 92 formed in the bracket 86. Accordingly, when the shaft 76 is rotated and the net 74 is stretched, an urging force for taking up the net 74 onto the shaft 76 is produced by the coil spring 88. Consequently, when the sunshade 16 is opened or closed, slackening does not occur in the net 74.

Next, a description will be given of the operation of this embodiment.

With the vehicle with a sunroof in accordance with this embodiment, if the sunshade 16 is opened, the end portion 74A of the net 74 moves in the rearward direction, so that the net 74 is stretched and closes the sunroof opening portion 12.

When the shaft 76 is rotated and the net 74 is stretched, an urging force for taking up the net 74 onto the shaft 76 is produced, so that slackening does not occur in the net 74. As a result, even if the sunroof is in the open state (in the state in which the sunroof panel 14 and the sunshade 16 are open), the stretched net 74 makes it possible to reliably prevent luggage and the like in the vehicle compartment from being thrown out of the vehicle through the sunroof opening portion 12.

Next, referring to FIGS. 16 and 17, a description will be given of a fourth embodiment of the vehicle with a sunroof in accordance with the present invention. It should be noted that the same members as those of the first embodiment will be denoted by the same reference numerals, and a description thereof will be omitted.

Figure 16:
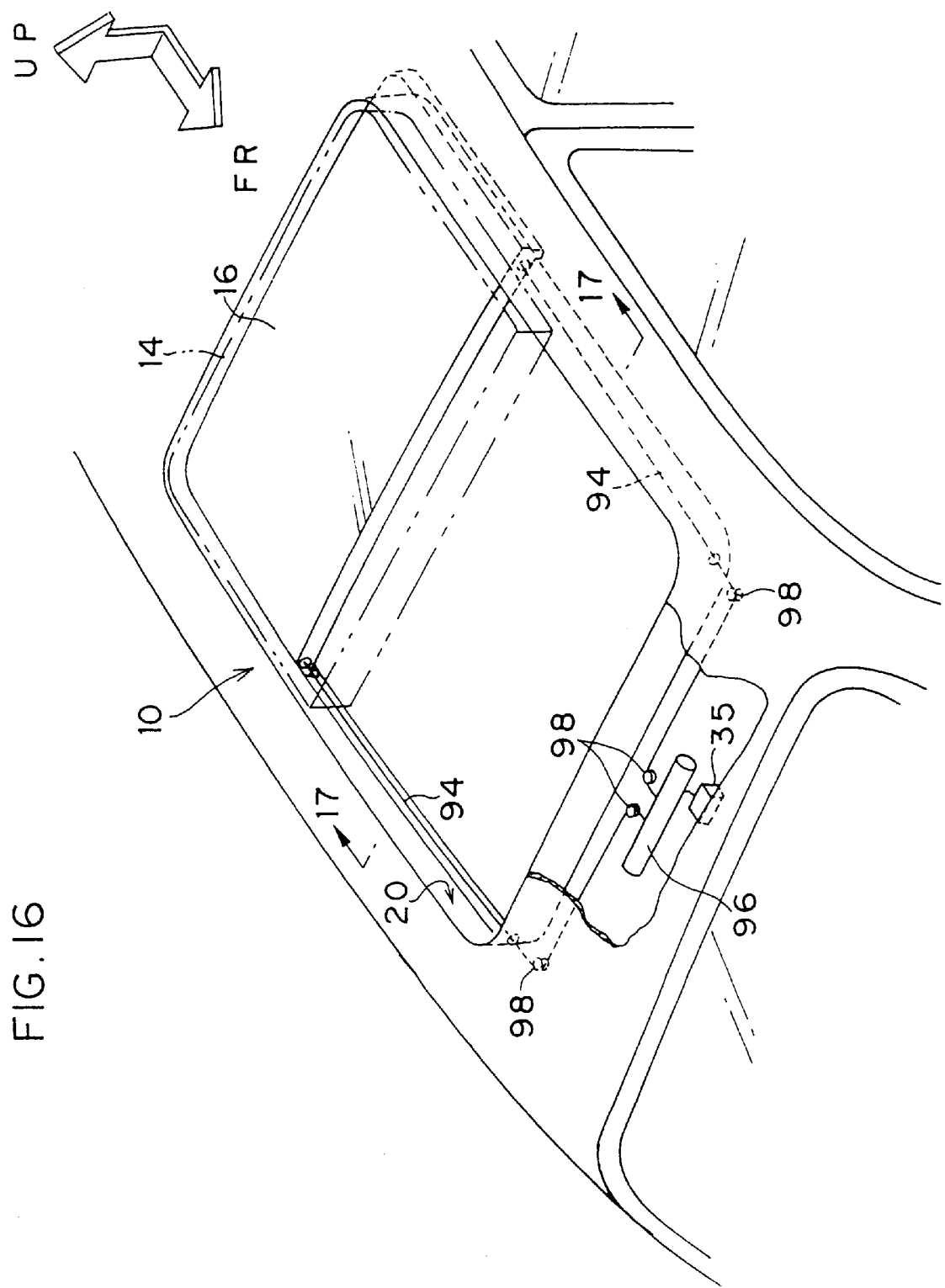
FIG. 16 is a fragmentary perspective view taken from a diagonally forward direction of the vehicle, and illustrates the vehicle compartment ceiling portion of the vehicle with a sunroof in accordance with a fourth embodiment of the present invention.
Figure 17:
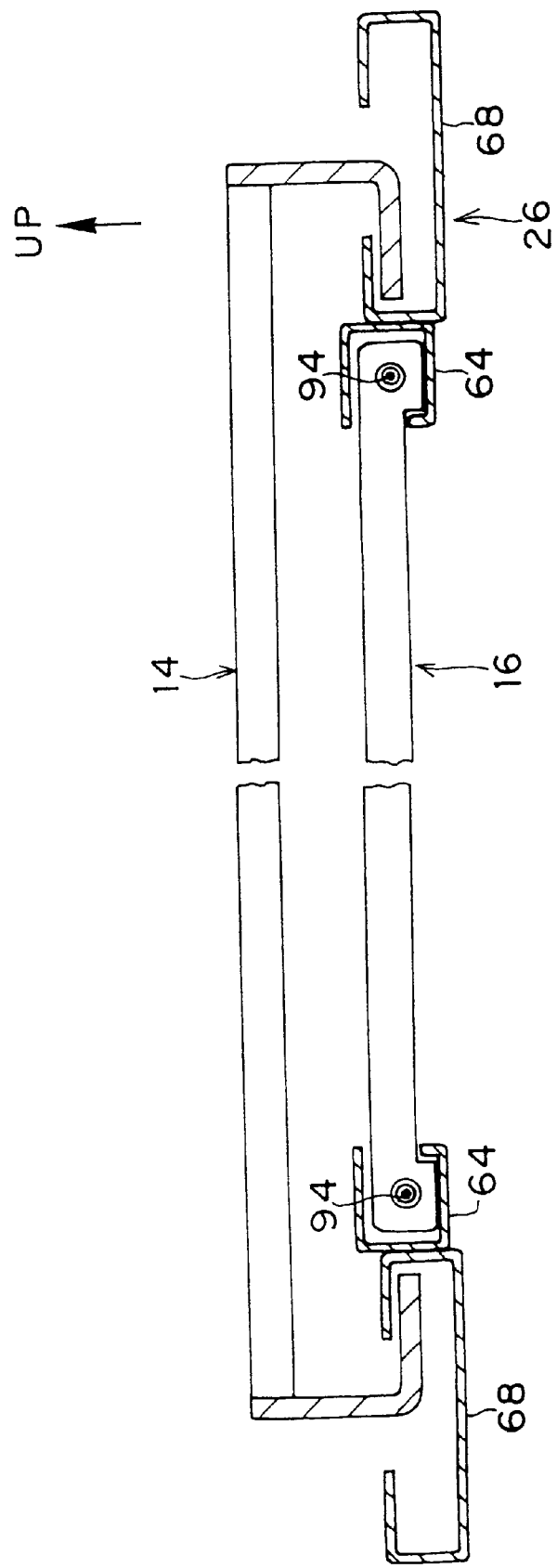
FIG. 17 is a cross-sectional view taken along line 17—17 in FIG. 16.

As shown in FIG. 16, with the vehicle with a sunroof in accordance with this embodiment, rear end portions of a pair of wires 94 disposed along the longitudinal direction of the vehicle are respectively fixed to forward-end opposite side portions of the sunshade 16 serving as the closing means. A wire pulling device 96 serving as the driving means is disposed in a substantially central portion in the transverse direction of the vehicle in a front portion of the sunroof case 26. The wires 94 are connected to the wire pulling device 96 via a plurality of guide rollers 98. The wire pulling device 96 is a known device which is used in a seat belt pretensioner or the like. Incidentally, the guide wires 94 are disposed within the sunshade guide rails 64 of the sunroof case 26, as shown in FIG. 17.

The wire pulling device 96 is connected to the rollover detection sensor 35, and when a rollover is detected by the rollover detection sensor 35, the wire pulling device 96 is operated to pull the guide wires 94. Further, as the guide wires 94 are pulled, the sunshade 16 moves to a position for closing the sunroof opening portion 12.

Next, a description will be given of the operation of this embodiment.

With the vehicle with a sunroof in accordance with this embodiment, when a rollover of the vehicle body is detected by the rollover detection sensor 35, the wire pulling device 96 is operated to pull the guide wires 94 in the forward direction. Consequently, the sunshade 16 to which the rear end portions of the wires 94 are fixed is moved in the forward direction, and the sunshade 16 closes the sunroof opening portion 12.

Accordingly, the sunshade 16 makes it possible to reliably prevent luggage and the like in the vehicle compartment from being thrown out of the vehicle through the sunroof opening portion 12. In addition, since the sunshade 16 is used, the structure is simple, and there is an advantage in terms of the accommodating space.

Incidentally, in this embodiment, the wire pulling device 96 may be provided with a so-called inertia lock mechanism in which a lock mechanism is operated when the sunshade 16 has moved at a fixed acceleration or greater in the opening direction (in the rearward direction of the vehicle), so as to inhibit the movement of the wires and the sunshade 16.

Next, referring to FIGS. 18 to 20, a description will be given of a fifth embodiment of the vehicle with a sunroof in accordance with the present invention. It should be noted that the same members as those of the first embodiment will be denoted by the same reference numerals, and a description thereof will be omitted.

Figure 18:
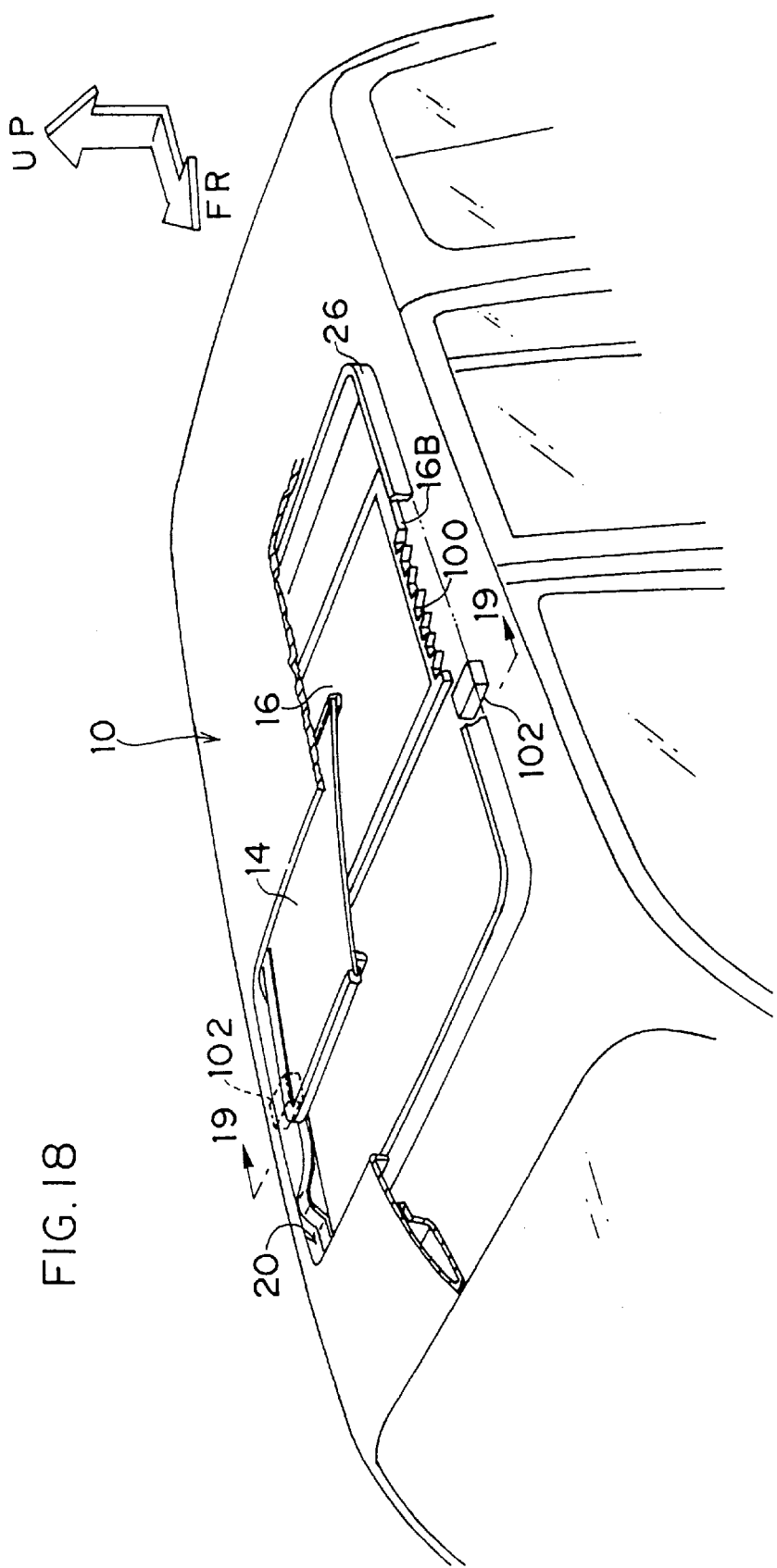
FIG. 18 is a fragmentary perspective view taken from a diagonally forward direction of the vehicle, and illustrates the vehicle compartment ceiling portion of the vehicle with a sunroof in accordance with a fifth embodiment of the present invention.

As shown in FIG. 18, with the vehicle with a sunroof in accordance with this embodiment, engaging grooves 100 constituting a lock mechanism are formed in left and right side portions 16B of the sunshade 16 at predetermined intervals in the longitudinal direction of the vehicle. A pair of lock devices 102 constituting other portions of the lock mechanism are disposed in longitudinally intermediate portions of the left and right side portions 16B of the sunroof case 26 in such a manner as to oppose the side portions 16B of the sunshade 16.

Figure 19:
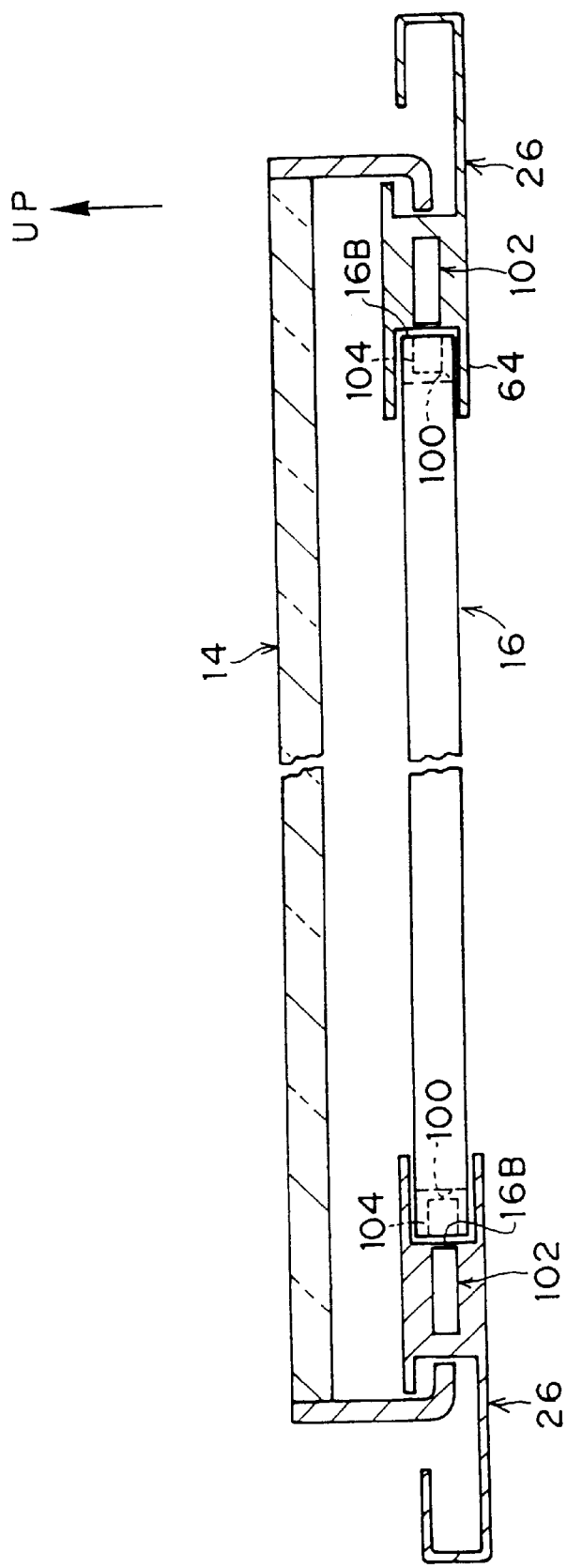
FIG. 19 is a cross-sectional view taken along line 19—19 in FIG. 18.

As shown in FIG. 19, each lock device 102 is disposed in the sunshade guide rail 64 of the sunroof case 26, and a lock pin 104 is capable of engaging in the engaging groove 100 of the sunshade 16.

Figure 20:
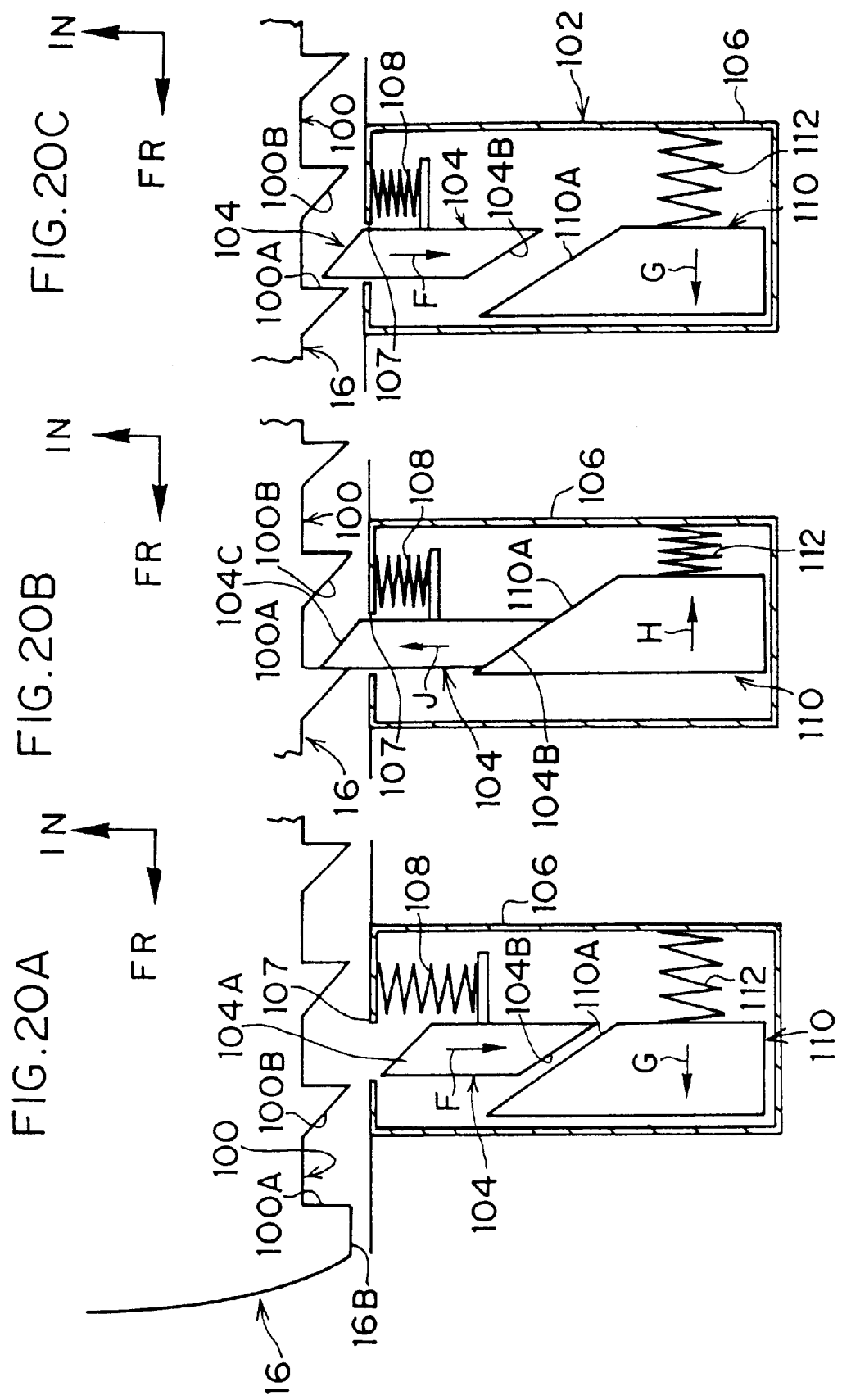
FIG. 20A is a diagram illustrating the operation of the vehicle with a sunroof in accordance with the fifth embodiment of the present invention.
FIG. 20B is a diagram illustrating the operation of the vehicle with a sunroof in accordance with the fifth embodiment of the present invention.
FIG. 20C is a diagram illustrating the operation of the vehicle with a sunroof in accordance with the fifth embodiment of the present invention.

As shown in FIG. 20A, the lock pin 104 is inserted in a case 106 of the lock device 102, and a distal end portion 104A of the lock pin 104 can be passed through a slot 107 formed in the case 106. In addition, the lock pin 104 is urged by a coil spring 108, which is disposed inside the case 106, in the outward direction of the vehicle (in the direction of arrow F in FIG. 20), and the distal end portion 104A is accommodated in the case 106 in a normal state.

A weight 110 is disposed inside the case 106 in such a manner as to be movable in the longitudinal direction of the vehicle, and the weight 110 is urged by a coil spring 112, which is disposed inside the case 106, in the forward direction of the vehicle (in the direction of arrow G in FIG. 20). Further, mutually opposing surfaces of the lock pin 104 and the weight 110 are respectively formed as inclined surfaces 104B and 110A.

For this reason, as shown in FIG. 20B, when a load of a predetermined value or greater is applied to the weight 110 in the rearward direction of the vehicle due to such as a rear collision or a rollover of the vehicle, the weight 110 moves in the rearward direction of the vehicle (in the direction of arrow H in the drawing) against the urging force of the coil spring 112. At this time, the inclined surface 110A of the weight 110 and the inclined surface 104B of the lock pin 104 slide on each other, and the lock pin 104 moves in the transversely inward direction of the vehicle (in the direction of arrow J in the drawing) against the urging force of the coil spring 108.

Consequently, the distal end portion 104A of the lock pin 104 engages an engaging wall portion 100A of the engaging groove 100 of the sunshade 16, and prevents the movement of the sunshade 16 in the opening direction (in the rearward direction of the vehicle).

A wall portion of the engaging groove 100 which opposes the engaging wall portion 100A is formed as a guide wall portion 100B. This guide wall portion 100B as well as a wall portion 104C of the lock pin 104 opposing the guide wall portion 100B are respectively formed as inclined surfaces.

It should be noted that, as shown in FIG. 20C, when the load of a predetermined value or greater has ceased to be applied to the weight 110 in the rearward direction of the vehicle, the weight 110 moves in the forward direction of the vehicle (in the direction of arrow G in the drawing) due to the urging force of the coil spring 112. At this time, the inclined surface 110A of the weight 110 and the inclined surface 104B of the lock pin 104 slide on each other, and the lock pin 104 moves in the transversely outward direction of the vehicle (in the direction of arrow F in the drawing) due to the urging force of the coil spring 108, thereby allowing the distal end portion 104A to enter the case 106.

Next, a description will be given of the operation of this embodiment.

With the vehicle with a sunroof in accordance with this embodiment, when the load of a predetermined value or greater is applied to the weight 110 of each lock device 102 in the rearward direction of the vehicle due to such as a rear collision or a rollover of the vehicle, the weight 110 moves in the rearward direction of the vehicle (in the direction of arrow H in the drawing) against the urging force of the coil spring 112. At this time, the inclined surface 110A of the weight 110 and the inclined surface 104B of the lock pin 104 slide on each other, and the lock pin 104 moves in the transversely inward direction of the vehicle (in the direction of arrow J in the drawing) against the urging force of the coil spring 108. Consequently, the distal end portion 104A of the lock pin 104 engages the engaging wall portion 100A of the engaging groove 100 of the sunshade 16 so as to prevent the movement of the sunshade 16 in the opening direction (in the rearward direction of the vehicle). Accordingly, since it is possible to prevent the sunshade 16 from moving in the open state from the closed state due to such as the rear collision or the rollover of the vehicle, it is possible to prevent luggage or the like in the vehicle compartment from being thrown out of the vehicle through the sunroof opening portion 12. In addition, since the sunshade 16 is used, the structure is simple, and there is an advantage in terms of the accommodating space.

Furthermore, with the vehicle with a sunroof in accordance with this embodiment, when the load of a predetermined value or greater has ceased to be applied to the weight 110 in the rearward direction of the vehicle, the weight 110 moves in the forward direction of the vehicle (in the direction of arrow G in the drawing) due to the urging force of the coil spring 112. At this time, the inclined surface 110A of the weight 110 and the inclined surface 104B of the lock pin 104 slide on each other, and the lock pin 104 moves in the transversely outward direction of the vehicle (in the direction of arrow F in the drawing) due to the urging force of the coil spring 108, thereby allowing the distal end portion 104A to enter the case 106. Therefore, the lock is unlocked, so that it is possible to close the sunshade 16 by making use of the inertial force acting in the closing direction.

Next, referring to FIGS. 21 to 26, a description will be given of a sixth embodiment of the vehicle with a sunroof in accordance with the present invention. It should be noted that the same members as those of the first embodiment will be denoted by the same reference numerals, and a description thereof will be omitted.

Figure 21:
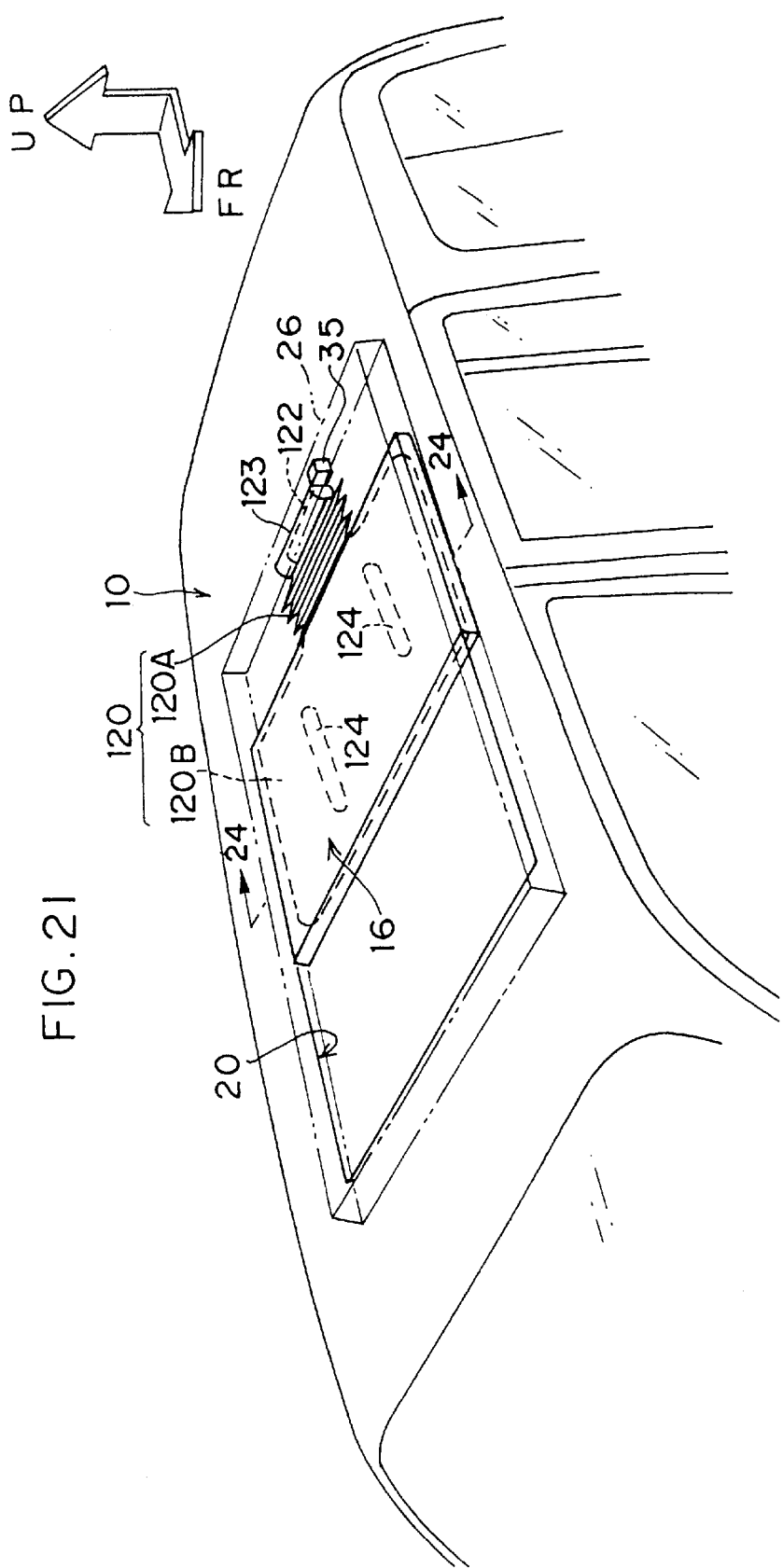
FIG. 21 is a perspective view taken from a diagonally forward direction of the vehicle, and illustrates essential portions of the vehicle compartment ceiling portion of the vehicle with a sunroof in accordance with a sixth embodiment of the present invention.

As shown in FIG. 21, with the vehicle with a sunroof in accordance with this embodiment, an air bag 120 serving as the closing means set in a noninflated state is accommodated in a substantially unfolded state in the interior of the sunshade 16 which also serves as the closing means. An inflator 122 serving as the driving means connected to the rollover detection sensor 35 is disposed in a rear portion of the inner side of the sunroof case 26. A gas introducing portion 120A of the air bag 120, which is folded in a bellows shape in the longitudinal direction of the vehicle, is connected to a diffuser 123 incorporating the inflator 122.

Figure 22:
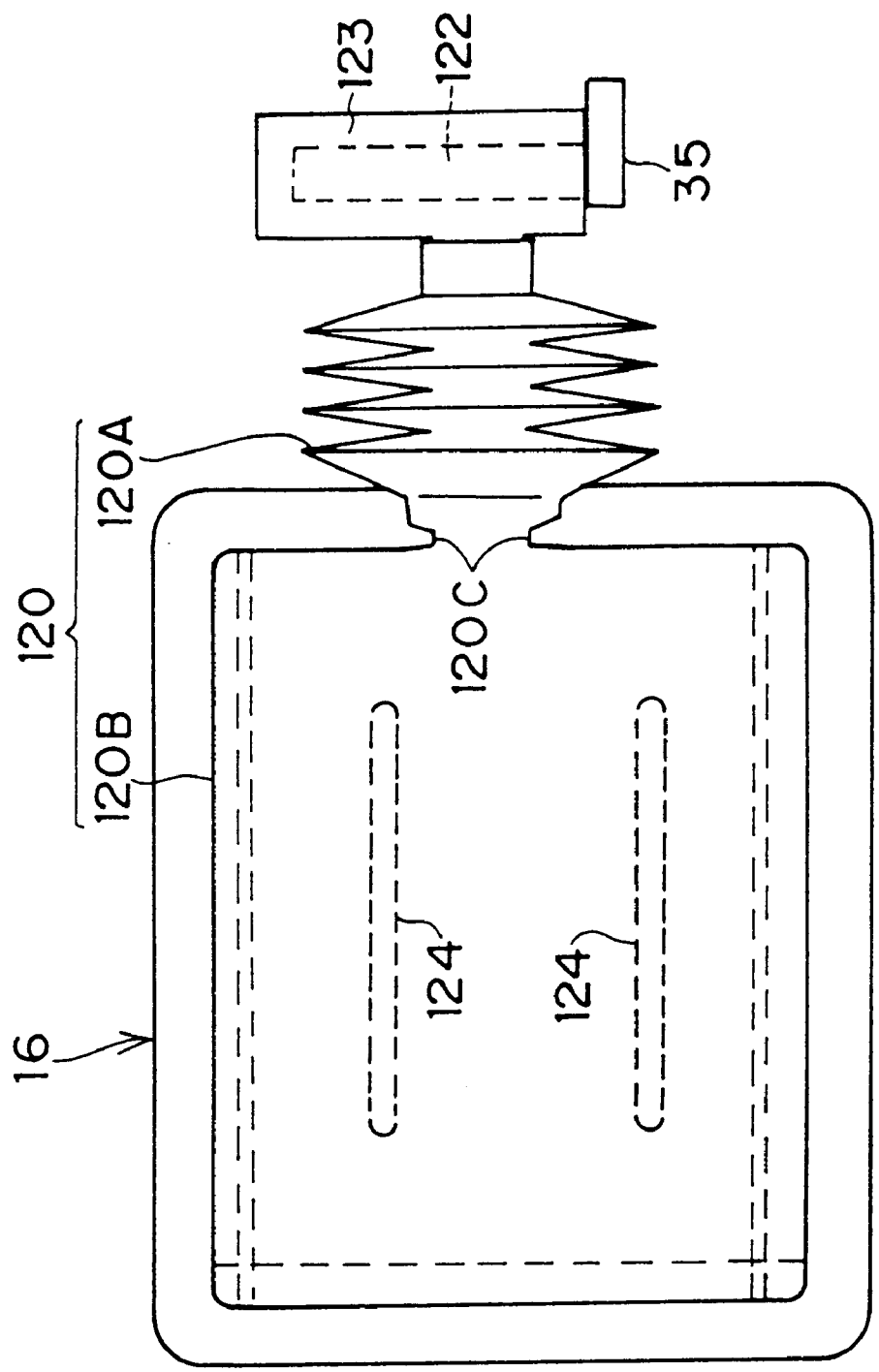
FIG. 22 is a schematic plan view illustrating essential portions in a sunroof open state of the vehicle with a sunroof in accordance with the sixth embodiment of the present invention.

As shown in FIG. 22, a constricted portion 120C is formed in a boundary portion between the gas introducing portion 120A and a body portion 120B of the air bag 120. A pair of noninflatable portions 124 extending in the longitudinal direction are formed in the body portion 120B of the air bag 120 at a predetermined interval in the transverse direction.

Figure 24:
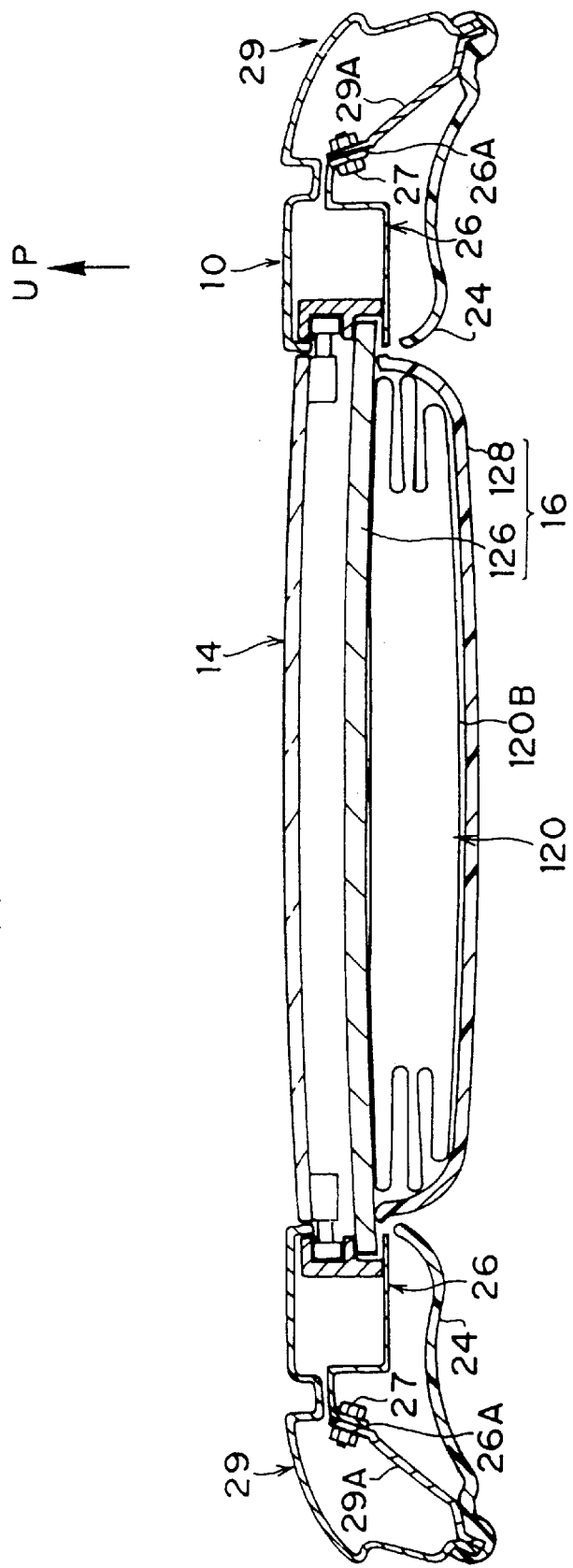
FIG. 24 is a cross-sectional view taken along line 24—24 in FIG. 21.

As shown in FIG. 24, the body portion 120B of the air bag 120 is accommodated between a base material 126 of the sunshade 16 and an outer layer 128 of the sunshade 16 in a state in which left and right side portions are slightly folded down.

Figure 23:
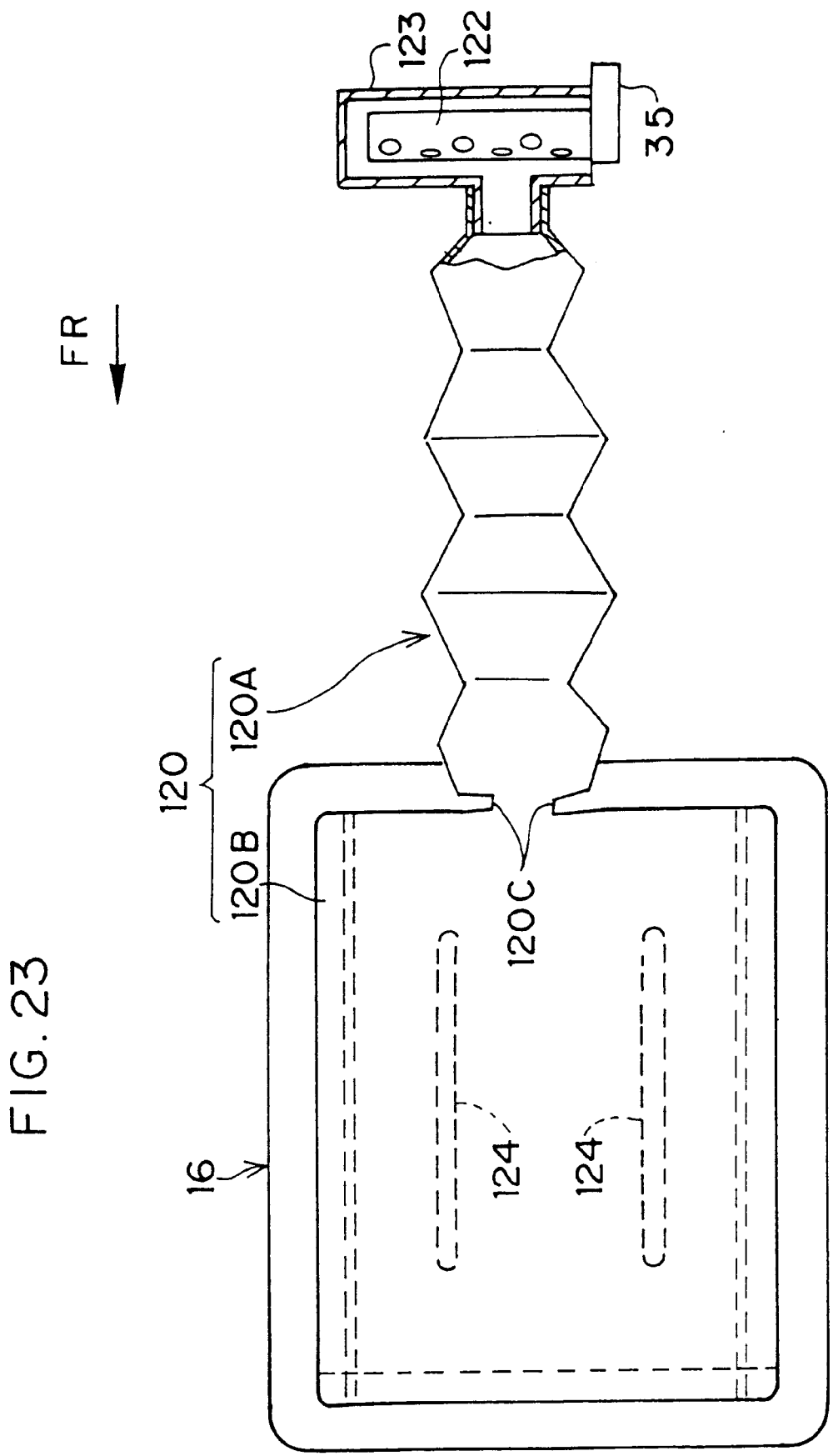
FIG. 23 is a schematic plan view, partly in section, illustrating essential portions in a sunroof closed state of the vehicle with a sunroof in accordance with the sixth embodiment of the present invention.

As a result, as shown in FIG. 23, when the inflator 122 is operated, the gas introducing portion 120A of the air bag 120 is first inflated to move the sunshade 16 in the closing direction (in the forward direction of the vehicle), thereby closing the sunshade 16.

Figure 25:
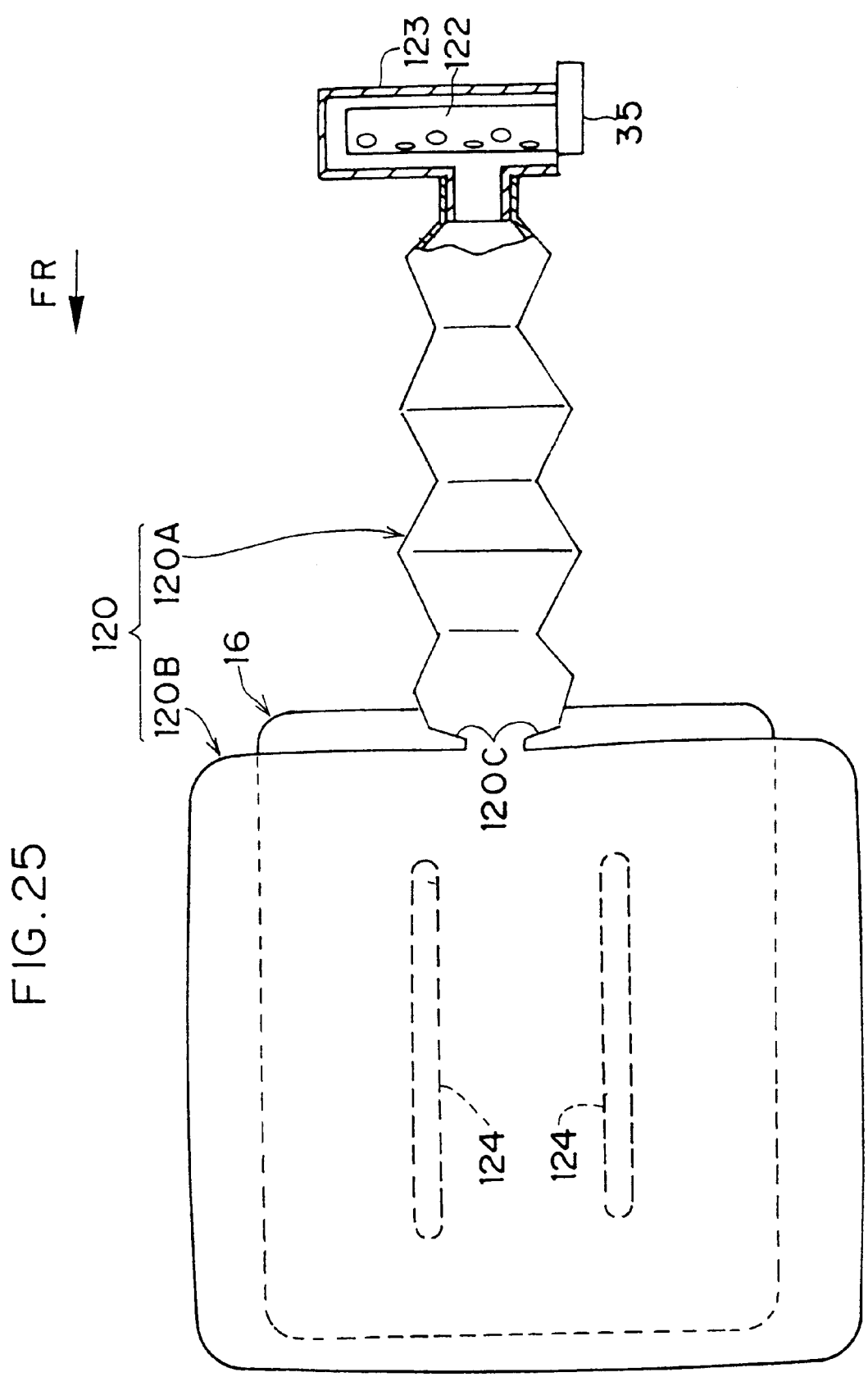
FIG. 25 is a schematic plan view, partly in section, illustrating essential portions in an air-bag inflation completed state of the vehicle with a sunroof in accordance with the sixth embodiment of the present invention.
Figure 26:
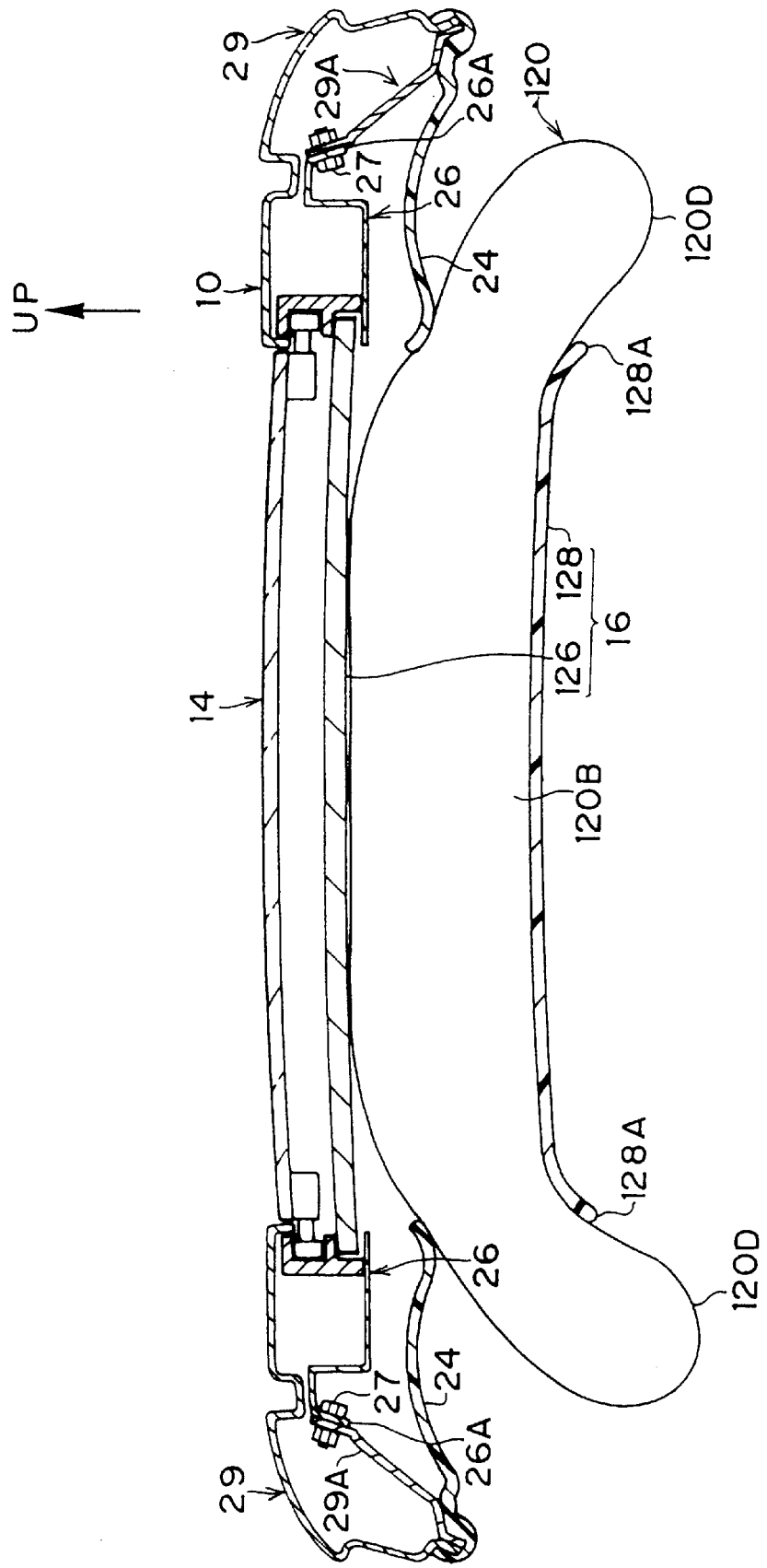
FIG. 26 is a cross-sectional view corresponding to FIG. 24 and illustrating the air-bag inflation completed state of the vehicle with a sunroof in accordance with the sixth embodiment of the present invention.
Figure 27:
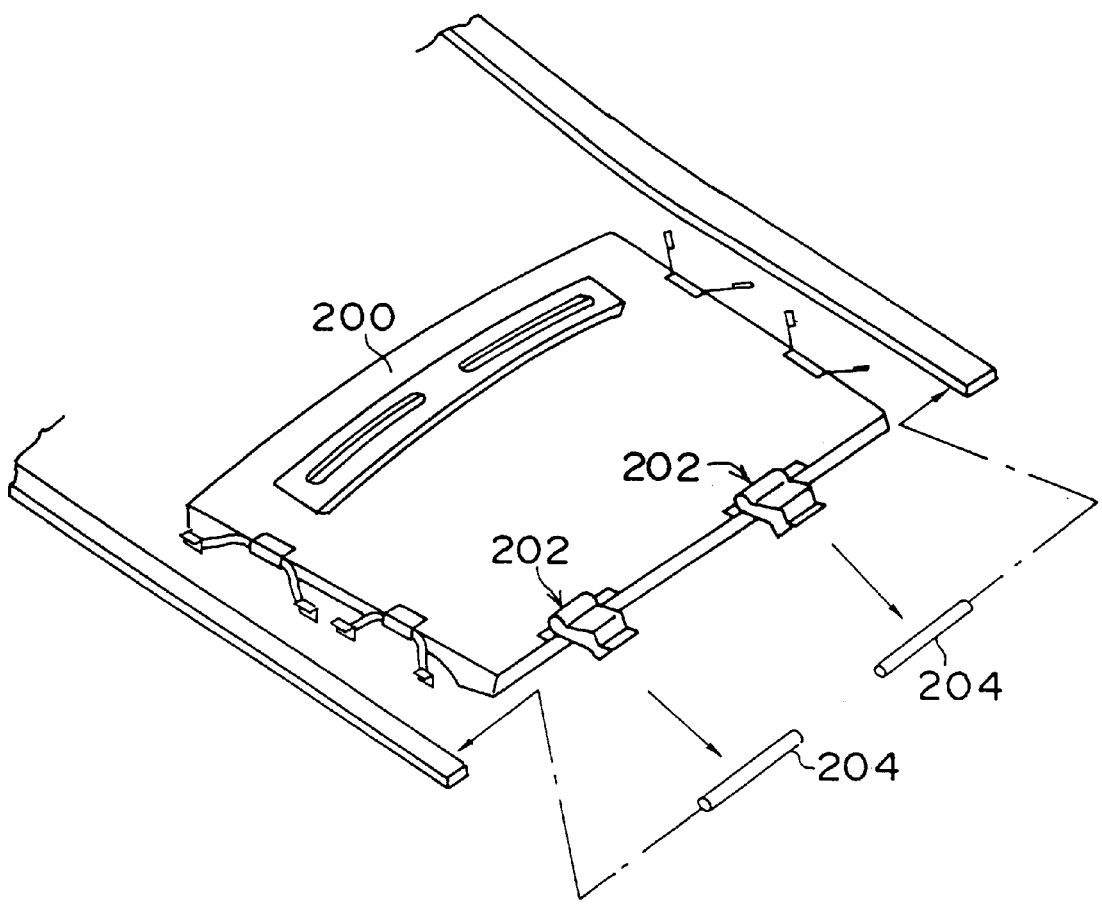
FIG. 27 is an exploded perspective view illustrating essential portions of a conventional vehicle with a sunroof.

As shown in FIG. 25, when the gas further flows into the air bag 120 from the inflator 122, the body portion 120B of the air bag 120 is inflated in the transversely outward direction of the vehicle. Consequently, as shown in FIG. 26, vehicle transverse opposite end portions 128A of the outer layer 128 of the sunshade 16 are opened to allow vehicle transverse opposite end portions 120D of the body portion 120B of the air bag 120 to be expanded toward the inner side of the vehicle compartment. Incidentally, the outer skin 128 of the sunshade 16 is bonded to the air bag 120, and is thereby prevented from falling down.

Next, a description will be given of the operation of this embodiment.

With the vehicle with a sunroof in accordance with this embodiment, when a rollover of the vehicle body is detected by the rollover detection sensor 35, the inflator 122 is operated. When the inflator 122 is operated, the gas introducing portion 120A of the air bag 120 is first inflated to move the sunshade 16 in the closing direction (in the forward direction of the vehicle) and closes the sunshade 16. Hence, it is possible to prevent luggage or the like in the vehicle compartment from being thrown out of the vehicle through the sunroof opening portion 12. In addition, since the air bag 120 is incorporated in the sunshade 16, it is possible to obtain a cushioning effect due to the air bag 120. Furthermore, since the air bag 120 is moved in the forward direction of the vehicle together with the sunshade 16, it is unnecessary to provide a means for guiding the air bag 120, so that the structure is made simple.

Although specific embodiments of the present invention have been described above in detail, the present invention is not limited to such embodiments, and it is apparent to those skilled in the art that various other modifications are possible within the scope of the present invention. For instance, a transparent sheet or another belt-shaped member may be used instead of the net.

Further, although in the above-described embodiments a description has been given of the vehicle with a sunroof in which the sunroof panel 14 and the sunshade 16 are formed independently, the present invention is also applicable to a vehicle with a sunroof which is constructed such that the sunroof panel is not transparent, and the sunroof panel and the sunshade are formed integrally.

What is claimed is:

1. A vehicle with a sunroof in which a roof opening portion formed in a vehicle compartment ceiling portion is openable and closable, comprising:

rollover detecting means that detects a rollover of the vehicle;

driving means operable on the basis of a detection value of the rollover detecting means;

an air bag that closes the roof opening portion by the operation of the driving means;

a stationary guide element extending in a longitudinal direction of the vehicle and provided along an edge of the roof opening portion, the guide element being constructed and arranged to extend over an entire length of the edge; and a lock mechanism connected to the guide element which is constructed and arranged to hold the airbag in an expanded state and to prevent the airbag from retracting.

2. The vehicle with a sunroof according to claim 1, wherein said driving means is an inflator.

3. The vehicle with a sunroof according to claim 1, wherein said driving means is an inflator, and said air bag is inflated by said inflator.

4. The vehicle with a sunroof according to claim 1, wherein said air bag has an expansion inducing means adapted to expand inflatable portions of said air bag in a forward direction of the vehicle starting with vehicle transverse opposite end portions of said inflatable portions.

5. A vehicle with a sunroof in which a roof opening portion formed in a vehicle compartment ceiling portion is openable and closable, comprising:

rollover detecting means for detecting a rollover of a vehicle;

driving means operable on the basis of a detection value of said rollover detecting means;

closing means for closing said roof opening portion by the operation of said driving means, wherein said closing means includes at least an air bag;

a stationary guide element extending in a longitudinal direction of the vehicle and provided along an edge of the roof opening portion, the guide element being constructed and arranged to extend over an entire length of the edge; and a lock mechanism connected to the guide element which is constructed and arranged to hold the airbag in an expanded state and to prevent the airbag from retracting.

6. The vehicle with a sunroof according to claim 1, wherein the air bag includes a plurality of inflatable chambers which communicate with an inflator as said driving means.

7. The vehicle with a sunroof according to claim 1, wherein a pair of noninflatable portions are formed in the middle of the air bag.

8. The vehicle with a sunroof according to claim 1, wherein the air bag is inflated by an inflator as said driving means, the air bag is inflated in the transversely outward direction of the vehicle with pressingly opening vehicle transverse opposite end portions of the outer layer of the sunshade, such that the air bag is expanded toward the inner side of the vehicle compartment beyond the transverse width of the roof opening portion.

* * * * *

UNITED STATES PATENT AND TRADEMARK OFFICE
CERTIFICATE OF CORRECTION

PATENT NO. : 6,189,960 B1
DATED : February 20, 2001
INVENTOR(S) : Mumura et al.

Page 1 of 1

It is certified that error appears in the above-identified patent and that said Letters Patent is hereby corrected as shown below:

<u>Title page,</u>
Item [75], Inventors,
Please change first inventor's name "Etsuhisa Mumura" to
-- Etsuhisa Mimura --.

Signed and Sealed this

Twenty-sixth Day of February, 2002

Attest:

Attesting Officer

JAMES E. ROGAN
Director of the United States Patent and Trademark Office